United States Patent
Farmer et al.

(10) Patent No.: US 11,492,443 B2
(45) Date of Patent: *Nov. 8, 2022

(54) PROCESS AND SYSTEM FOR PRODUCTION OF POLYPROPIOLACTONE

(71) Applicant: Novomer, Inc., Rochester, NY (US)

(72) Inventors: Jay J. Farmer, Rochester, NY (US); Peter Galebach, Rochester, NY (US); Kyle Sherry, Rochester, NY (US); Sadesh H. Sookraj, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/851,517

(22) Filed: Apr. 17, 2020

(65) Prior Publication Data

US 2020/0239627 A1 Jul. 30, 2020

Related U.S. Application Data

(62) Division of application No. 15/550,234, filed as application No. PCT/US2016/017878 on Feb. 12, 2016, now Pat. No. 10,662,283.

(60) Provisional application No. 62/116,326, filed on Feb. 13, 2015.

(51) Int. Cl.
  C08G 63/08 (2006.01)
  C08G 63/82 (2006.01)
  B01D 3/14 (2006.01)

(52) U.S. Cl.
  CPC .......... *C08G 63/08* (2013.01); *C08G 63/823* (2013.01); *B01D 3/14* (2013.01); *Y02P 20/10* (2015.11)

(58) Field of Classification Search
  CPC ........ B01D 3/14; C08G 63/08; C08G 63/823; Y02P 20/10
  See application file for complete search history.

(56) References Cited

U.S. PATENT DOCUMENTS

| | | | |
|---|---|---|---|
| 3,169,945 A | 2/1965 | Hostettler |
| 3,678,069 A | 7/1972 | Busler |
| 5,310,948 A | 5/1994 | Drent et al. |
| 5,359,081 A | 10/1994 | Drent et al. |
| 5,648,452 A | 7/1997 | Schechtman et al. |
| 5,705,688 A | 1/1998 | Fauconet et al. |

(Continued)

FOREIGN PATENT DOCUMENTS

| | | |
|---|---|---|
| JP | 2015-529644 A | 10/2015 |
| WO | 2003050154 A2 | 6/2003 |

(Continued)

OTHER PUBLICATIONS

Erin W. Dunn and Geoffrey W. Coates Carbonylative Polymerization of Propylene Oxide: A Multicatalytic Approach to the Synthesis of Poly(3-Hydroxybutyrate), J. Am. Chem. Soc. 2010, 132, 11412-11413 (Year: 2010).*

(Continued)

*Primary Examiner* — Frances Tischler
*Assistant Examiner* — Gennadiy Mesh
(74) *Attorney, Agent, or Firm* — Young Basile Hanlon & MacFarlane, P.C.

(57) ABSTRACT

Provided are integrated processes for the conversion of ethylene oxide to polypropiolactone. System for the production of polypropiolactone are also provided.

18 Claims, 1 Drawing Sheet

(56) References Cited

U.S. PATENT DOCUMENTS

| | | | |
|---|---|---|---|
| 6,133,402 A | 10/2000 | Coates et al. | |
| 6,316,590 B1 | 11/2001 | Coates et al. | |
| 6,538,101 B2 | 3/2003 | Coates et al. | |
| 6,541,665 B1 | 4/2003 | Bastiaensen et al. | |
| 6,608,170 B1 | 8/2003 | Coates | |
| 7,420,064 B2 | 9/2008 | Luinstra et al. | |
| 8,445,703 B2 | 5/2013 | Allen et al. | |
| 8,796,475 B2 | 8/2014 | Allen et al. | |
| 9,096,510 B2 | 8/2015 | Porcelli et al. | |
| 9,156,803 B2 | 10/2015 | Allen et al. | |
| 9,206,144 B2 | 12/2015 | Allen et al. | |
| 9,327,280 B2 | 5/2016 | Lee et al. | |
| 9,403,788 B2 | 8/2016 | Lee et al. | |
| 9,493,391 B2 | 11/2016 | Allen et al. | |
| 9,914,689 B2 | 3/2018 | Porcelli et al. | |
| 10,099,988 B2 | 10/2018 | Farmer et al. | |
| 10,099,989 B2 | 10/2018 | Sookraj | |
| 10,221,150 B2 | 3/2019 | Farmer et al. | |
| 10,221,278 B2 | 3/2019 | Lee et al. | |
| 2012/0123137 A1 | 5/2012 | Allen et al. | |
| 2013/0165670 A1 | 6/2013 | Allen et al. | |
| 2013/0281715 A1 | 10/2013 | Allen et al. | |
| 2014/0018570 A1 | 1/2014 | Pazicky et al. | |
| 2014/0275575 A1 | 9/2014 | Allen et al. | |
| 2014/0296522 A1 | 10/2014 | Lee et al. | |
| 2014/0309399 A1 | 10/2014 | Porcelli et al. | |
| 2015/0005513 A1 | 1/2015 | Lee et al. | |
| 2015/0141693 A1 | 5/2015 | Allen et al. | |
| 2015/0299083 A1 | 10/2015 | Porcelli et al. | |
| 2015/0368394 A1 | 12/2015 | Allen | |
| 2016/0016876 A1 | 1/2016 | Mahoney | |
| 2016/0102040 A1 | 4/2016 | Allen et al. | |
| 2016/0102068 A1 | 4/2016 | Allen et al. | |
| 2016/0288057 A1 | 10/2016 | Lapointe et al. | |
| 2017/0029352 A1 | 2/2017 | Sookraj et al. | |
| 2017/0073463 A1 | 3/2017 | Lee et al. | |
| 2017/0080409 A1 | 3/2017 | Farmer et al. | |
| 2017/0096407 A1 | 4/2017 | Sookraj | |
| 2017/0107103 A1 | 4/2017 | Sookraj et al. | |
| 2017/0145126 A1 | 5/2017 | Mahoney | |
| 2017/0225157 A1 | 8/2017 | Lee | |
| 2017/0247309 A1 | 8/2017 | Porcelli et al. | |
| 2018/0016219 A1 | 1/2018 | Farmer et al. | |
| 2018/0022677 A1 | 1/2018 | Sookraj | |
| 2018/0029005 A1 | 2/2018 | Sookraj | |
| 2018/0030014 A1 | 2/2018 | Sookraj et al. | |
| 2018/0030015 A1 | 2/2018 | Farmer et al. | |
| 2018/0057619 A1 | 3/2018 | Sookraj | |
| 2018/0094100 A1 | 4/2018 | Farmer et al. | |
| 2018/0354881 A1 | 12/2018 | Farmer et al. | |
| 2018/0354882 A1 | 12/2018 | Sookraj | |
| 2019/0030520 A1 | 1/2019 | Lee | |

FOREIGN PATENT DOCUMENTS

| | | |
|---|---|---|
| WO | 2004089923 A1 | 10/2004 |
| WO | 2010118128 A1 | 10/2010 |
| WO | 2012030619 A1 | 3/2012 |
| WO | 2012158573 A1 | 11/2012 |
| WO | 2013063191 A1 | 5/2013 |
| WO | 2013122905 A1 | 8/2013 |
| WO | 2013126375 A1 | 8/2013 |
| WO | 2014004858 A1 | 1/2014 |
| WO | 2014008232 A2 | 1/2014 |
| WO | 2015085295 A2 | 6/2015 |
| WO | 2015138975 A1 | 9/2015 |
| WO | 2015171372 A1 | 11/2015 |
| WO | 2015184289 A1 | 12/2015 |
| WO | 2016015019 A1 | 1/2016 |
| WO | 2016130947 A1 | 8/2016 |
| WO | 2016130977 A1 | 8/2016 |
| WO | 2016130988 A1 | 8/2016 |
| WO | 2016130993 A1 | 8/2016 |
| WO | 2016130998 A1 | 8/2016 |
| WO | 2016131001 A1 | 8/2016 |
| WO | 2016131003 A1 | 8/2016 |
| WO | 2016131004 A1 | 8/2016 |
| WO | 2017023777 A1 | 2/2017 |
| WO | 2017023820 A1 | 2/2017 |
| WO | 2017165344 A1 | 9/2017 |
| WO | 2017165345 A1 | 9/2017 |
| WO | 2018085251 A1 | 5/2018 |
| WO | 2018085254 A1 | 5/2018 |
| WO | 2018136638 A1 | 7/2018 |
| WO | 2018170006 A1 | 9/2018 |
| WO | 2019051184 A1 | 3/2019 |

OTHER PUBLICATIONS

Jianwei Jiang et al "Base Effects on Carbonylative Polymerization of Propylene Oxide with a [(salph)Cr(THF)2]+[Co(CO)4]- Catalyst" Top Catal (2017) 60:750-754 (Year: 2017).*

Senkuttuvan Rajendiran et al "Direct Conversion of Propylene Oxide to 3-Hydroxy Butyric Acid Using a Cobalt Carbonyl Ionic Liquid Catalyst", Catalysts 2017, 7, 228 (Year: 2017).*

Agostini et al., "Synthesis and Characterization of Poly-13-Hydroxybutyrate. I. Synthesis of Crystalline DL-Poly-13-Hydroxybutyrate from DL-13-Hydroxybutyrolactone", Journal of Polymer Science, Part A-1, vol. 9, 1971, pp. 2775-2787.

Billingham et al., "Polymerization and Copolymerizationof 13-Butyrolactone by Aluminium Compounds", Journal of Organometallic Chemistry, vol. 341, No. 1-3, 1988, pp. 83-89.

Church et al., "Carbonylation of Heterocycles by Homogeneous Catalysts", Chemical Communication, 2007, pp. 657-674.

Extended European Search Report (includes Supplementary European Search Report and European Search Opinion) received for European Patent Application No. 16750024.8, dated Aug. 13, 2018, 7 pages.

Getzler et al., "Synthesis of 13-Lactones: A Highly Active and Selective Catalyst for Epoxide Carbonylation", Journal of the American Chemical Society. vol. 124, No. 7, 2002, pp. 1174-1175.

Gross et al., "Polymerization of 13-Monosubstituted-13-Propiolactones using Trialkylaluminum-Water Catalytic Systems and Polymer Characterization", Macromolecules, vol. 21, No. 9, 1988, pp. 2657-2668.

Hori et al., "Ring-Opening Polymerization of Optically Active 13-Butyrolactone using Distannoxane Catalysts: Synthesis of High-Molecular-Weight Poly (3-Hydroxybutyrate)", Macromolecules, vol. 26, No. 20, 1993, pp. 5533-5534.

International Preliminary Report on Patentability received for PCT Patent Application No. PCTUS2016017878, dated Aug. 24, 2017, 7 pages.

International Search Report and Written Opinion received for PCT Patent Application No. PCTUS2016017878, dated May 2, 2016, 9 pages.

Rieth et al., "Single-Site Beta-Diiminate Zinc Catalysts for the Ring-Opening Polymerization of Beta-Butyrolactone and Beta-Valerolactone to Poly (3-Hydroxyalkanoates).", Journal of the American Chemical Society, vol. 124, No. 51, 2002, pp. 15239-15248.

Schechtman et al, "Chemical Synthesis of Isotactic Poly(3-Hydroxyalkanoates)", Polymer Preprints, Division Of Polymer Chemistry, Inc., vol. 40, No. 1, 1999, pp. 508-509.

Tanahashi et al., "Thermal Properties and Stereoregularity of Poly (3-Hydroxybutyrate) prepared from Optically Active 13-Butyrolactone with a Zinc-based Catalyst", Macromolecules, vol. 24, No. 20, 1991, pp. 5732-5733.

Zhang et al., "Stereochemistry of the Ring-Opening Polymerization of (S)-13-Butyrolactone", Macromolecules, vol. 23, No. 13, 1990, pp. 3206-3212.

* cited by examiner

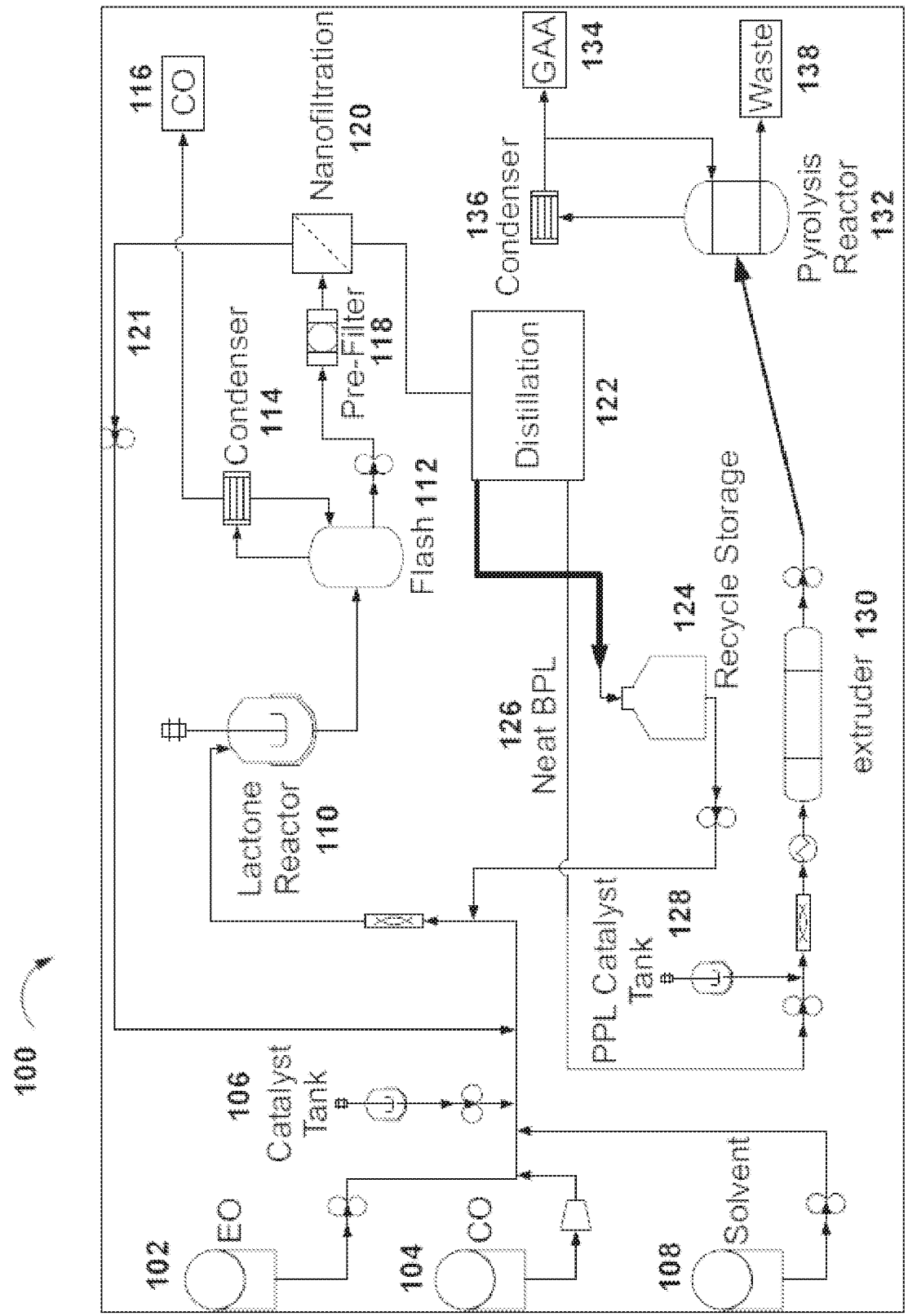

PROCESS AND SYSTEM FOR PRODUCTION OF POLYPROPIOLACTONE

CROSS-REFERENCE TO RELATED APPLICATIONS

This application is a divisional of U.S. patent application Ser. No. 15/550,234 filed Aug. 10, 2017 (U.S. Pub. No. 2018-0030201), which was a U.S. National Phase Patent Application of PCT/US2016/017878, filed Feb. 12, 2016, which claims priority to and the benefit of U.S. Provisional Patent Application No. 62/116,326, filed Feb. 13, 2015, each of which is incorporated herein by reference in its entirety.

FIELD

The present disclosure relates generally to polypropiolactone production, and more specifically to the production of polypropiolactone from feedstock streams of ethylene oxide and carbon monoxide.

BACKGROUND

Polypropiolactone is a useful precursor for the production of acrylic acid. Pyrolysis of polypropiolactone yields glacial acrylic acid, which is in high demand for the production of polyacrylic acid-based superabsorbent polymers. One advantage of polypropiolactone is that it can be safely transported and stored for extended periods of time without the safety or quality concerns associated with shipping and storing glacial acrylic acid. Given the size of the acrylic acid market and the importance of downstream applications of acrylic acid, there is a need for improved methods of producing precursors of acrylic acid such as polypropiolactone.

Methods have been described where polypropiolactone (PPL) is prepared via carbonylation of ethylene oxide with carbon monoxide, followed by polymerization of a beta propiolactone (BPL) intermediate. However, this process can create solvent compatibility issues when run as a continuous process, e.g., using the product stream of carbonylation as the BPL feedstock stream for polymerization. For example, optimal solvents used for carbonylation are often orthogonal with optimal solvents for the polymerization step. As such, methods to address such a problem in the art are desired.

BRIEF SUMMARY

In one aspect, provided is a method for the synthesis of polypropiolactone (PPL) comprising:
providing feedstock streams of ethylene oxide (EO) and carbon monoxide, wherein the feedstock streams are optionally combined:
    directing the feedstock streams to a first reaction zone;
    contacting the feedstock streams with a carbonylation catalyst in the presence of a carbonylation solvent in the first reaction zone to convert at least a portion of the EO to a beta propiolactone (BPL) product stream, wherein the BPL product stream comprises BPL, carbonylation catalyst, and carbonylation solvent:
    separating at least a portion of carbonylation catalyst from the BPL product stream to produce a carbonylation catalyst recycling stream and a processed BPL product stream, wherein the processed BPL product stream comprises BPL and carbonylation solvent;
    directing the processed BPL product stream to a carbonylation solvent removal zone:
    removing at least a portion of the carbonylation solvent from the processed BPL product stream to produce a polymerization feed stream, wherein the polymerization feed stream comprises BPL;
    directing the polymerization feed stream to a second reaction zone; and
    contacting BPL in the polymerization feed stream with a polymerization catalyst in the second reaction zone to produce PPL.

In some variations of the method described above, the method further comprises introducing a second solvent into the polymerization feed stream, prior to contacting the polymerization feed stream with the polymerization catalyst.

In another aspect, provided is a system for converting ethylene oxide to polypropiolactone (PPL), comprising:
    an ethylene oxide source;
    a carbon monoxide source;
    a carbonylation catalyst source;
    a carbonylation solvent source;
    a polymerization catalyst source;
    a first reaction zone configured to receive ethylene oxide from the ethylene oxide source, carbon monoxide from the carbon monoxide source, carbonylation catalyst from the carbonylation catalyst source, and carbonylation solvent from the carbonylation solvent source, and to output a beta propiolactone (BPL) product stream from contacting the ethylene oxide and the carbon monoxide with the carbonylation catalyst in the presence of the carbonylation solvent in the first reaction zone, wherein the BPL product stream comprises carbonylation solvent and BPL;
    a solvent removal unit configured to remove at least a portion of the carbonylation solvent from the BPL product stream; and
    a second reaction zone configured to receive the BPL product stream from the solvent removal unit, and polymerization catalyst from the polymerization catalyst source, and to output a PPL product stream from contacting the BPL product stream with the polymerization catalyst in the second reaction zone, wherein the PPL product stream comprises PPL.

BRIEF DESCRIPTION OF THE FIGURES

The present application can be best understood by reference to the following description taken in conjunction with the accompanying FIGURE, in which like parts may be referred to by like numerals.

FIG. 1 depicts an exemplary system for production of polypropiolactone and acrylic acid.

DEFINITIONS

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999, Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. In some variations, the aliphatic group is unbranched or branched. In other variations, the aliphatic group is cyclic. Unless otherwise specified, in some variations, aliphatic groups contain 1-30 carbon atoms. In some embodiments, aliphatic groups contain 1-12 carbon atoms. In some embodiments, aliphatic groups contain 1-8 carbon atoms. In some embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments, aliphatic groups contain 1-2 carbon atoms. Suitable aliphatic groups include, for example, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, phosphorus, or boron. In some embodiments, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "hetercyclyl," "heterocycloaliphatic," or "heterocyclic" groups. In some variations, the heteroaliphatic group is branched or unbranched. In other variations, the heteroaliphatic group is cyclic. In yet other variations, the heteroaliphatic group is acyclic.

The term "acrylate" or "acrylates" as used herein refer to any acyl group having a vinyl group adjacent to the acyl carbonyl. The terms encompass mono-, di- and tri-substituted vinyl groups. Acrylates may include, for example, acrylate, methacrylate, ethacrylate, cinnamate (3-phenylacrylate), crotonate, tiglate, and senecioate.

The terms "crude acrylic acid" and "glacial acrylic acid", as used herein, describe acrylic acid of relatively low and high purity, respectively. Crude acrylic acid (also called technical grade acrylic acid) has a typical minimum overall purity level of 94% and can be used to make acrylic esters for paint, adhesive, textile, paper, leather, fiber, and plastic additive applications. Glacial acrylic acid has a typical overall purity level ranging from 98% to 99.99% and can be used to make polyacrylic acid for superabsorbent polymers (SAPs) in disposable diapers, training pants, adult incontinence undergarments and sanitary napkins. Polyacrylic acid is also used in compositions for paper and water treatment, and in detergent co-builder applications. In some variations, acrylic acid has a purity of at least 98%, at least 98.5%, at least 99%, at least 99.1%, at least 99.2%, at least 99.3%, at least 99.4%, at least 99.5%, at least 99.6%, at least 99.7%, at least 99.8%, or at least 99.9%; or between 99% and 99.95%, between 99.5% and 99.95%, between 99.6% and 99.95%, between 99.7% and 99.95%, or between 99.8% and 99.95%.

Suitable salts of PAA include metal salts, such those of any alkali (e.g., $Na^+$, $K^+$) cations, alkaline earth cations. In certain embodiments, the PAA salt is the $Na^+$ salt, i.e., sodium PAA. In certain embodiments, the salt is the $K^+$ salt, i.e., potassium PAA.

Impurities in glacial acrylic acid are reduced to an extent possible to facilitate a high-degree of polymerization to acrylic acid polymers (PAA) and avoid adverse effects from side products in end applications. For example, aldehyde impurities in acrylic acid hinder polymerization and may discolor the polymerized acrylic acid. Maleic anhydride impurities form undesirable copolymers which may be detrimental to polymer properties. Carboxylic acids, e.g., saturated carboxylic acids that do not participate in the polymerization, can affect the final odor of PAA or SAP-containing products and/or detract from their use. For example, foul odors may emanate from SAP that contains acetic acid or propionic acid and skin irritation may result from SAP that contains formic acid. The reduction or removal of impurities from petroleum-based acrylic acid is costly, whether to produce petroleum-based crude acrylic acid or petroleum-based glacial acrylic acid. Such costly multistage distillations and/or extraction and/or crystallizations steps are generally employed (e.g., as described in U.S. Pat. Nos. 5,705,688 and 6,541,665).

The term "polymer", as used herein, refers to a molecule comprising multiple repeating units. In some variations, the polymer is a molecule of high relative molecular mass, the structure of which comprises the multiple repetition of units derived, actually or conceptually, from molecules of low relative molecular mass. In some embodiments, a polymer is comprised of only one monomer species (e.g., polyethylene oxide). In some embodiments, the polymer may be a copolymer, terpolymer, heteropolymer, block copolymer, or tapered heteropolymer of one or more epoxides. In one variation, the polymer may be a copolymer, terpolymer, heteropolymer, block copolymer, or tapered heteropolymer of two or more monomers.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic, bicyclic, or polycyclic ring systems, as described herein, having from 3 to 12 members, wherein the aliphatic ring system is optionally substituted as defined above and described herein. Cycloaliphatic groups include, for example, cyclopropyl, cyclobutyl, cyclopentyl, cyclopentenyl, cyclohexyl, cyclohexenyl, cycloheptyl, cycloheptenyl, cyclooctyl, cyclooctenyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a carbocyclic group is tricyclic. In some embodiments, a carbocyclic group is polycyclic.

The term "alkyl," as used herein, refers to a saturated hydrocarbon radical. In some variations, the alkyl group is a saturated, straight- or branched-chain hydrocarbon radicals derived from an aliphatic moiety containing between one and six carbon atoms by removal of a single hydrogen atom. Unless otherwise specified, in some variations, alkyl groups contain 1-12 carbon atoms. In some embodiments, alkyl groups contain 1-8 carbon atoms. In some embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Alkyl radicals may include, for example, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, and dodecyl.

The term "alkenyl," as used herein, denotes a monovalent group having at least one carbon-carbon double bond. In some variations, the alkenyl group is a monovalent group derived from a straight- or branched-chain aliphatic moiety having at least one carbon-carbon double bond by the removal of a single hydrogen atom. Unless otherwise specified, in some variations, alkenyl groups contain 2-12 carbon atoms. In some embodiments, alkenyl groups contain 2-8 carbon atoms. In some embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, and 1-methyl-2-buten-1-yl.

The term "alkynyl," as used herein, refers to a monovalent group having at least one carbon-carbon triple bond. In some variations, the alkynyl group is a monovalent group derived from a straight- or branched-chain aliphatic moiety having at least one carbon-carbon triple bond by the removal of a single hydrogen atom. Unless otherwise specified, in some variations, alkynyl groups contain 2-12 carbon atoms. In some embodiments, alkynyl groups contain 2-8 carbon atoms. In some embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, for example, ethynyl, 2-propynyl (propargyl), and 1-propynyl.

The term "carbocycle" and "carbocyclic ring" as used herein, refers to monocyclic and polycyclic moieties wherein the rings contain only carbon atoms. Unless otherwise specified, carbocycles may be saturated, partially unsaturated or aromatic, and contain 3 to 20 carbon atoms. Representative carbocyles include, for example, cyclopropane, cyclobutane, cyclopentane, cyclohexane, bicyclo[2,2,1]heptane, norbornene, phenyl, cyclohexene, naphthalene, and spiro[4.5]decane.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In some embodiments, "aryl" refers to an aromatic ring system which includes, for example, phenyl, naphthyl, and anthracyl, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenanthridinyl, and tetrahydronaphthyl.

The terms "heteroaryl" and "heteroar-", used alone or as part of a larger moiety, e.g., "heteroaralkyl", or "heteroaralkoxy", refer to groups having 5 to 14 ring atoms, preferably 5, 6, 9 or 10 ring atoms; having 6, 10, or 14 pi ($\pi$) electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, for example, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle", "heterocyclyl", "heterocyclic radical", and "heterocyclic ring" are used interchangeably and may be saturated or partially unsaturated, and have, in addition to carbon atoms, one or more, preferably one to four, heteroatoms, as defined above. In some variations, the heterocyclic group is a stable 5- to 7-membered monocyclic or 7- to 14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, for example, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be monocyclic or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds described herein may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned are preferably those that result in the formation of stable or chemically feasible compounds. The term "stable", as used herein, refers to compounds that are not substantially altered when subjected to conditions to allow for their production, detection, and, in some embodiments, their recovery, purification, and use for one or more of the purposes disclosed herein.

In some chemical structures herein, substituents are shown attached to a bond which crosses a bond in a ring of the depicted molecule. This means that one or more of the substituents may be attached to the ring at any available position (usually in place of a hydrogen atom of the parent structure). In cases where an atom of a ring so substituted has two substitutable positions, two groups may be present on the same ring atom. When more than one substituent is present, each is defined independently of the others, and each may have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally substituted" group are independently halogen; —(CH$_2$)$_{0-4}$R$^\circ$; —(CH$_2$)$_{0-4}$OR$^\circ$; —O(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-1}$Ph, which may be substituted with R$^\circ$; —(CH$_2$)$_{0-4}$O(CH$_2$)$_{0-1}$Ph which may be substituted with R$^\circ$; —CH=CHPh, which may be substituted with R$^\circ$; —NO$_2$; —CN; —N$_3$; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ$$_2$; —N(R$^\circ$)C(S)NR$^\circ$$_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ$$_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)N(R$^\circ$)$_2$; —(CH$_2$)$_{0-4}$C(O)SR$^\circ$; —(CH$_2$)$_{0-4}$C(O)OSiR$^\circ$$_3$; —(CH$_2$)$_{0-4}$OC(O)R$^\circ$; —OC(O)(CH$_2$)$_{0-4}$SR$^\circ$; —SC(S)SR$^\circ$; —(CH$_2$)$_{0-4}$SC(O)R$^\circ$; —(CH$_2$)$_{0-4}$C(O)NR$^\circ$$_2$; —C(S)NR$^\circ$$_2$; —C(S)SR$^\circ$; —SC(S)SR$^\circ$, —(CH$_2$)$_{0-4}$OC(O)NR$^\circ$$_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ$$_2$; —(CH$_2$)$_{0-4}$S(O)R$^\circ$; —N(R$^\circ$)S(O)$_2$NR$^\circ$$_2$; —N(R$^\circ$)S(O)$_2$R$^\circ$; —N(OR$^\circ$)R$^\circ$; —C(NH)NR$^\circ$$_2$; —P(O)$_2$R$^\circ$; —P(O)R$^\circ$$_2$; —OP(O)R$^\circ$$_2$; —OP(O)(OR$^\circ$)$_2$; SiR$^\circ$$_3$;—(C$_{1-4}$ straight or branched alkylene)O—N(R$^\circ$)$_2$; or —(C$_{1-4}$ straight or branched alkylene)C(O)O—N(R$^\circ$)$_2$, wherein each R$^\circ$ may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, and sulfur, or, notwithstanding the definition above, two independent occurrences of R$^\circ$, taken together with their intervening atom(s), form a 3-12-membered saturated, partially unsaturated, or aryl mono- or polycyclic ring having 0-4 heteroatoms independently selected from nitrogen, oxygen, and sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_2$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R$^\circ$)$_2$; (CH$_2$)$_{0-2}$SR$^\bullet$, (CH$_2$)$_{0-2}$SH, (CH$_2$)$_{0-2}$NH$_2$, (CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$. —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, and sulfur. Suitable divalent substituents on a saturated carbon atom of R$^\circ$ include =O and =S.

Suitable divalent substituents on a saturated carbon atom of an "optionally substituted" group include the following: =O, =S, =NNR*$_2$, =NNHC(O)R*. =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, and sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, and sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, and sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, and sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, and sulfur.

Suitable substituents on the aliphatic group of $R^†$ are independently halogen, —R$^•$, -(haloR$^•$), —OH, —OR$^•$, —O(haloR$^•$), —CN, —C(O)OH, —C(O)OR$^•$, —NH$_2$, —NHR$^•$, —NR$^•_2$, or —NO$_2$, wherein each R$^•$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, and sulfur.

As used herein, the term "catalyst" refers to a substance the presence of which increases the rate of a chemical reaction, while not being consumed or undergoing a permanent chemical change itself.

"Tetradentate" refers to ligands having four sites capable of coordinating to a single metal center.

As used herein, the term "about" preceding one or more numerical values means the numerical value±5%. It should be understood that reference to "about" a value or parameter herein includes (and describes) embodiments that are directed to that value or parameter per se. For example, description referring to "about x" includes description of "x" per se.

DETAILED DESCRIPTION

The methods and systems described herein address one of the problems known in the art by removing the carbonylation solvent prior to the polymerization step. In doing so, the methods described herein for the production of PPL are more flexible and efficient. In one aspect, provided are methods for carbonylation of ethylene oxide with carbon monoxide to produce BPL, removal of carbonylation solvent from BPL, and polymerization of BPL to produce PPL. Removal of carbonylation solvent at this stage allows for a different solvent to be used in the polymerization step, provides a clean recycled solvent stream, and is easier to remove than in downstream contexts. In one specific example, the method described herein allows for the use of THF in carbonylation processes feeding into PPL production. Because THF may poison certain catalysts of PPL polymerization, it cannot be used in some continuous carbonylation-polymerization processes. However, the methods described herein allow the selection of optimal solvents for each of the carbonylation and polymerization steps, which may be different, thereby increasing the flexibility and efficiency of PPL production.

I. Methods

In one aspect, provided are integrated processes and methods for the production of PPL from ethylene oxide. In certain embodiments, provided are integrated processes for the conversion of ethylene oxide to PPL via carbonylation, wherein carbonylation solvent is removed following the carbonylation step and prior to PPL polymerization.

In some embodiments, provided is a method for the synthesis of PPL comprising:

(a) providing feedstock streams of ethylene oxide (EO) and carbon monoxide, which feedstock streams are optionally combined;

(b) directing the feedstock streams to a first reaction zone where they are contacted with a carbonylation catalyst in the presence of a carbonylation solvent and where at least a portion of the EO is converted to a beta propiolactone (BPL) product stream comprising BPL;

(c) separating carbonylation catalyst from the beta lactone product stream to provide a carbonylation catalyst recycling stream; and (d) directing the beta propiolactone product stream comprising BPL and carbonylation solvent to a carbonylation solvent removal zone where carbonylation solvent is removed from the beta propiolactone product stream; and (e) optionally introducing a second solvent into the beta propiolactone product stream after step (d) and directing the beta propiolactone product stream to a second reaction zone where BPL is contacted with a polymerization catalyst to form polypropiolactone.

In some variations, provided is a method for the synthesis of polypropiolactone (PPL) comprising:

providing feedstock streams of ethylene oxide (EO) and carbon monoxide, wherein the feedstock streams are optionally combined:

directing the feedstock streams to a first reaction zone;

contacting the feedstock streams with a carbonylation catalyst in the presence of a carbonylation solvent in the first reaction zone to convert at least a portion of the EO to a beta propiolactone (BPL) product stream, wherein the BPL product stream comprises BPL, carbonylation catalyst, and carbonylation solvent;

separating at least a portion of carbonylation catalyst from the BPL product stream to produce a carbonylation catalyst recycling stream and a processed BPL product stream, wherein the processed BPL product stream comprises BPL and carbonylation solvent:

directing the processed BPL product stream to a carbonylation solvent removal zone;

removing at least a portion of the carbonylation solvent from the processed BPL product stream to produce a polymerization feed stream, wherein the polymerization feed stream comprises BPL:

directing the polymerization feed stream to a second reaction zone; and contacting BPL in the polymerization feed stream with a polymerization catalyst in the second reaction zone to produce PPL.

In some variations of the method described above, the method further comprises introducing a second solvent into the polymerization feed stream, prior to contacting the polymerization feed stream with the polymerization catalyst.

The sections below describe more fully certain embodiments of the methods and conditions utilized for such methods.

Carbonylation

In certain embodiments, the disclosed methods include a first reaction zone for carbonylation of EO into BPL via a "carbonylation reaction." Methods of making BPL from EO are known in the art and include those described in WO2013/063191 and WO2014/004858. In some embodiments, the first reaction zone receives a mixture containing the EO (such as from the EO source) and CO (such as from the CO source), as well as a carbonylation catalyst and solvents, and carries out the carbonylation reaction of the EO in the first reaction zone. In certain embodiments, the carbonylation reaction is continuous. Such continuous carbonylation reactions can be conducted in a continuous stirred tank reactor or a plug flow reactor such that BPL solution is withdrawn at essentially the same rate it is formed.

In certain embodiments, the carbonylation reaction of EO to BPL proceeds as shown below:

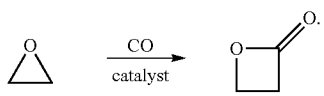

Carbonylation Reaction Conditions

Suitable catalysts and reaction conditions for effecting the carbonylation reaction are described herein and also disclosed in published PCT applications: WO2003/050154, WO2004/089923, WO2012/158573, WO2010/118128, WO2013/063191, and WO2014/008232; in U.S. Pat. Nos. 5,359,081 and 5,310,948 and in the publication "Synthesis of beta-Lactones" *J. Am. Chem. Soc.*, vol. 124, 2002, pages 1174-1175.

In certain embodiments, a carbonylation reaction is fed by a feedstock stream comprising EO and CO. In certain embodiments, the feedstock stream fed into the carbonylation reaction comprises a mixture containing EO and CO. In certain embodiments, the molar ratio of CO to EO in the reaction stream ranges from about 1:1 to about 10,000:1. In certain embodiments, the molar ratio of CO to EO in the reaction stream is about 5000:1, is about 2500:1, is about 2000:1, is about 1500:1, is about 1000:1, is about 500:1, is about 1:500, is about 200:1, is about 100:1, is about 50:1, is about 20:1, is about 10:1, is about 5:1 or is about 1:1, or within a range including any two of these ratios. In some embodiments, the ratio of carbon monoxide to epoxide is selected based on other reaction conditions so that the reaction proceeds in an economical and time-feasible manner.

In certain embodiments, a feedstock stream further comprises one or more additional components. In certain embodiments, the additional components comprise diluents which do not directly participate in the chemical reactions of EO. In certain embodiments, such diluents may include one or more inert gases (e.g., nitrogen, argon, helium and the like) or volatile organic molecules such as hydrocarbons, ethers, and the like. In certain embodiments, the reaction stream may comprise hydrogen, traces of carbon dioxide, methane, and other compounds commonly found in industrial CO streams. In certain embodiments, the feedstock stream may further comprise materials that may have a direct or indirect chemical function in one or more of the processes involved in the conversion of EO to BPL and various end products. Additional reactants can also include mixtures of CO and another gas. For example, as noted above, in certain embodiments, CO is provided in a mixture with hydrogen (e.g., Syngas).

In certain embodiments, a feedstock stream is characterized in that it is essentially free of oxygen. In certain embodiments, a feedstock stream is characterized in that it is essentially free of water. In certain embodiments, a feedstock stream is characterized in that it is essentially free of oxygen and water. In some variations, the feedstock stream has less than 0.01 wt % of oxygen. In certain variations, the feedstock stream has less than 0.005 wt % oxygen. In certain variations, the feedstock stream has less than 200 ppm oxygen. In certain variations, the feedstock stream has less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen. In certain variations, the feedstock stream has less than 0.05 wt % water. In certain variations, the feedstock stream has less than 0.01 wt % water. In certain variations, the feedstock stream has less than 1000 ppm water. In certain variations, the feedstock stream has less than 500 ppm water, less than 400 ppm water, less than 250 ppm water, less than 200 ppm water, less than 150 ppm water, less than 100 ppm water, less than 50 ppm water, or less than 10 ppm water. In certain variations, the feedstock stream has less than 200 ppm of oxygen and water combined.

Carbonylation Solvents

In certain embodiments, a carbonylation reaction described herein is performed in a solvent. In certain embodiments, a solvent is fed to the first reaction zone as a separate stream. In other embodiments, the solvent may be fed to a first reaction zone along with the catalyst, EO or another feed stream entering the carbonylation reaction in the first reaction zone. In certain embodiments, the solvent enters the first reaction zone along with a carbonylation catalyst which is provided as a catalyst solution in the solvent. In certain embodiments, a solvent enters a first reaction zone in two or more separate feed streams. In embodiments where solvent is present in a first reaction zone, it is also present in the carbonylation outlet stream (such as in the BPL product stream).

A carbonylation solvent may be selected from any solvent, and mixtures of solvents. Additionally, BPL may be utilized as a co-solvent. Solvents most suitable for carbonylation methods include ethers, hydrocarbons, and non protic polar solvents. Suitable solvents include, for example, tetrahydrofuran ("THF"), tetrahydropyran, 2,5-dimethyl tetrahydrofuran, sulfolane, N-methyl pyrrolidone, 1,3 dimethyl-2-imidazolidinone, diglyme, triglyme, tetraglyme, diethylene glycol dibutyl ether, isosorbide ethers, methyl tertbutyl ether, diethylether, diphenyl ether, 1,4-dioxane, ethylene carbonate, propylene carbonate, butylene carbonate, dibasic esters, diethyl ether, acetonitrile, ethyl acetate, propyl acetate, butyl acetate, 2-butanone, cyclohexanone, toluene, difluorobenzene, dimethoxy ethane, acetone, and methylethyl ketone. Without wishing to be bound by any particular theory, solvents with good Lewis basic donicity may be highly useful as carbonylation solvents. In some embodiments, a carbonylation solvent is a polar donating solvent. In some embodiments, a carbonylation solvent is THF.

In certain embodiments, the carbonylation reaction further includes a Lewis base additive to the carbonylation reaction in the first reaction zone. In some embodiments such Lewis base additives can stabilize or reduce deactivation of the catalysts. In certain embodiments, a Lewis base additive is selected from the group consisting of phosphines, amines, guanidines, amidines, and nitrogen-containing heterocycles. In certain embodiments, a Lewis base additive is a hindered amine base. In certain embodiments, a Lewis base additive is a 2,6-lutidine; imidazole, 1-methylimidazole, 4-dimethylaminopyridine, trihexylamine and triphenylphosphine. Any combinations of the Lewis base additives described herein may also be used.

Carbonylation Catalyst

Numerous carbonylation catalysts known in the art are suitable for (or can be adapted to) the methods described herein. For example, in some embodiments, the carbonylation methods utilize a metal carbonyl-Lewis acid catalyst such as those described in U.S. Pat. No. 6,852,865. In other embodiments, the carbonylation step is performed with one or more of the carbonylation catalysts disclosed in U.S. patent application Ser. Nos. 10/820,958; and 10/586,826. In other embodiments, the carbonylation step is performed with one or more of the catalysts disclosed in U.S. Pat. Nos. 5,310,948; 7,420,064; and 5,359,081. Additional catalysts for the carbonylation of epoxides are discussed in a review in Chem. Commun., 2007, 657-674.

In some embodiments, the carbonylation catalyst includes a metal carbonyl compound. Typically, in one variation, a single metal carbonyl compound is provided, but in some embodiments, mixtures of two or more metal carbonyl compounds are provided. Thus, when a provided metal carbonyl compound "comprises", e.g., a neutral metal carbonyl compound, it is understood that the provided metal carbonyl compound can be a single neutral metal carbonyl compound, or a neutral metal carbonyl compound in combination with one or more metal carbonyl compounds. Preferably, the provided metal carbonyl compound is capable of ring-opening an epoxide and facilitating the insertion of CO into the resulting metal carbon bond. Metal carbonyl compounds with this reactivity are well known in the art and are used for laboratory experimentation as well as in industrial processes such as hydroformylation.

In some embodiments, the metal carbonyl compound comprises an anionic metal carbonyl moiety. In other embodiments, the metal carbonyl compound comprises a neutral metal carbonyl compound. In some embodiments, the metal carbonyl compound comprises a metal carbonyl hydride or a hydrido metal carbonyl compound. In some embodiments, the metal carbonyl compound acts as a pre-catalyst which reacts in situ with one or more reaction components to provide an active species different from the compound initially provided. Such pre-catalysts are specifically encompassed as it is recognized that the active species in a given reaction may not be known with certainty; thus the identification of such a reactive species in situ does not itself depart from the spirit or teachings herein.

In some embodiments, the metal carbonyl compound comprises an anionic metal carbonyl species. In some embodiments, such anionic metal carbonyl species have the general formula $[Q_dM'_e(CO)_w]^{y-}$, where Q is any ligand and need not be present, $M^1$ is a metal atom, d is an integer between 0 and 8 inclusive, e is an integer between 1 and 6 inclusive, w is a number such as to provide the stable anionic metal carbonyl complex, and y is the charge of the anionic metal carbonyl species. In some embodiments, the anionic metal carbonyl has the general formula $[QM'(CO)_w]^{y-}$, where Q is any ligand and need not be present, $M^1$ is a metal atom, w is a number such as to provide the stable anionic metal carbonyl, and y is the charge of the anionic metal carbonyl.

In some embodiments, the anionic metal carbonyl species include monoanionic carbonyl complexes of metals from groups 5, 7 or 9 of the periodic table or dianionic carbonyl complexes of metals from groups 4 or 8 of the periodic table. In some embodiments, the anionic metal carbonyl compound contains cobalt or manganese. In some embodiments, the anionic metal carbonyl compound contains rhodium. Suitable anionic metal carbonyl compounds include, for example, $[Co(CO)_4]^-$, $[Ti(CO)_6]^{2-}$, $[V(CO)_6]^-$, $[Rh(CO)_4]^-$, $[Fe(CO)_4]^{2-}$, $[Ru(CO)_4]^{2-}$, $[Os(CO)_4]^{2-}$, $[Cr_2(CO)_{10}]^{2-}$, $[Fe_2(CO)_8]^{2-}$, $[Tc(CO)_5]^-$, $[Re(CO)_5]^-$, and $[Mn(CO)_5]^-$. In some embodiments, the anionic metal carbonyl comprises $[Co(CO)_4]^-$. In some embodiments, a mixture of two or more anionic metal carbonyl complexes may be present in the carbonylation catalysts used in the methods.

The term "such as to provide a stable anionic metal carbonyl" for $[Q_dM'_e(CO)_w]^{y-}$ is used herein to mean that $[Q_dM'_e(CO)_w]^{y-}$ is a species that can be characterized by analytical means, e.g., NMR, IR, X-ray crystallography, Raman spectroscopy and/or electron spin resonance (EPR) and isolable in catalyst form in the presence of a suitable cation or a species formed in situ. It is to be understood that metals which can form stable metal carbonyl complexes have known coordinative capacities and propensities to form polynuclear complexes which, together with the number and character of optional ligands Q that may be present and the charge on the complex will determine the number of sites available for CO to coordinate and therefore the value of w. Typically, such compounds conform to the "18-electron rule". Such knowledge is within the grasp of one having ordinary skill in the arts pertaining to the synthesis and characterization of metal carbonyl compounds.

In embodiments where the metal carbonyl compound is an anionic species, one or more cations must also necessarily be present. The present disclosure places no particular constraints on the identity of such cations. In some embodiments, the cation associated with an anionic metal carbonyl compound comprises a reaction component of another category described herein below. For example, in some embodiments, the metal carbonyl anion is associated with a cationic Lewis acid. In other embodiments a cation associated with a provided anionic metal carbonyl compound is a simple metal cation such as those from Groups 1 or 2 of the periodic table (e.g., $Na^+$, $Li^+$, $K^+$, and $Mg^{2+}$). In other embodiments a cation associated with a provided anionic metal carbonyl compound is a bulky non electrophilic cation such as an 'onium salt' (e.g., $Bu_4N^+$, $PPN^+$, $Ph_4P^+$, and $Ph_4As^+$). In other embodiments, a metal carbonyl anion is associated with a protonated nitrogen compound (e.g., a cation may comprise a compound such as $MeTBD\text{-}H^+$, $DMAP\text{-}H^+$, $DABCO\text{-}H^+$, and $DBU\text{-}H^+$). In some embodiments, compounds comprising such protonated nitrogen compounds are provided as the reaction product between an acidic hydrido metal carbonyl compound and a basic nitrogen-containing compound (e.g., a mixture of DBU and $HCo(CO)_4$).

In some embodiments, a catalyst utilized in the methods described herein comprises a neutral metal carbonyl compound. In some embodiments, such neutral metal carbonyl compounds have the general formula $Q_dM'_e(CO)_{w'}$, where Q is any ligand and need not be present, M' is a metal atom, d is an integer between 0 and 8 inclusive, e is an integer between 1 and 6 inclusive, and w' is a number such as to provide the stable neutral metal carbonyl complex. In some embodiments, the neutral metal carbonyl has the general formula $QM'(CO)_{w'}$. In some embodiments, the neutral metal carbonyl has the general formula $M'(CO)_{w'}$. In some embodiments, the neutral metal carbonyl has the general formula $QM'_2(CO)_{w'}$. In some embodiments, the neutral metal carbonyl has the general formula $M'_2(CO)_{w'}$. Suitable neutral metal carbonyl compounds include, for example. $Ti(CO)_7$, $V_2(CO)_{12}$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Ru(CO)_5$, $Os(CO)_5$, $Ru_3(CO)_{12}$, $Os_3(CO)_{12}$, $Fe_3(CO)_{12}$, $Fe_2(CO)_9$, $Co_4(CO)_{12}$, $Rh_4(CO)_{12}$, $Rh_6(CO)_{16}$, $Ir_4(CO)_{12}$, $Co_2(CO)_8$, and $Ni(CO)_4$.

The term "such as to provide a stable neutral metal carbonyl" for $Q_dM'_e(CO)_{w'}$ is used herein to mean that $Q_dM'_e(CO)_{w'}$ is a species that can be characterized by analytical means, e.g., NMR, IR, X-ray crystallography, Raman spectroscopy and/or electron spin resonance (EPR) and isolable in pure form or a species formed in situ. It is to be understood that metals which can form stable metal carbonyl complexes have known coordinative capacities and propensities to form polynuclear complexes which, together with the number and character of optional ligands Q that may be present will determine the number of sites available for CO to coordinate and therefore the value of w'. Typically, such compounds conform to stoichiometries conforming to the "18-electron rule". Such knowledge is within the grasp of one having ordinary skill in the arts pertaining to the synthesis and characterization of metal carbonyl compounds.

In some embodiments, no ligands Q are present on the metal carbonyl compound. In other embodiments, one or more ligands Q are present on the metal carbonyl compound. In some embodiments, where Q is present, each occurrence of Q is selected from the group consisting of phosphine ligands, amine ligands, cyclopentadienyl ligands, heterocyclic ligands, nitriles, phenols, and combinations of two or more of these. In some embodiments, one or more of the CO ligands of any of the metal carbonyl compounds described above is replaced with a ligand Q. In some embodiments, Q is a phosphine ligand. In some embodiments, Q is a triaryl phosphine. In some embodiments, Q is trialkyl phosphine. In some embodiments. Q is a phosphite ligand. In some embodiments. Q is an optionally substituted cyclopentadienyl ligand. In some embodiments, Q is cp. In some embodiments, Q is cp*. In some embodiments, Q is an amine or a heterocycle.

In some embodiments, the carbonylation catalyst utilized in the methods described above further includes a Lewis acidic component. In some embodiments, the carbonylation catalyst includes an anionic metal carbonyl complex and a cationic Lewis acidic component. In some embodiments, the metal carbonyl complex includes a carbonyl cobaltate and the Lewis acidic co-catalyst includes a metal-centered cationic Lewis acid. In some embodiments, an included Lewis acid comprises a boron compound.

In some embodiments, where an included Lewis acid comprises a boron compound, the boron compound comprises a trialkyl boron compound or a triaryl boron compound. In some embodiments, an included boron compound comprises one or more boron-halogen bonds. In some embodiments, where an included boron compound comprises one or more boron-halogen bonds, the compound is a dialkyl halo boron compound (e.g., $R_2BX$), a dihalo monoalkyl compound (e.g., $RBX_2$), an aryl halo boron compound (e.g., $Ar_2BX$ or $ArBX_2$), or a trihalo boron compound (e.g., $BCl_3$ or $BBr_3$), wherein each R is an alkyl group; each X is a halogen; and each Ar is an aromatic group.

In some embodiments, where the included Lewis acid comprises a metal-centered cationic Lewis acid, the Lewis acid is a cationic metal complex. In some embodiments, the cationic metal complex has its charge balanced either in part, or wholly by one or more anionic metal carbonyl moieties. Suitable anionic metal carbonyl compounds include those described above. In some embodiments, there are 1 to 17 such anionic metal carbonyls balancing the charge of the metal complex. In some embodiments, there are 1 to 9 such anionic metal carbonyls balancing the charge of the metal complex. In some embodiments, there are 1 to 5 such anionic metal carbonyls balancing the charge of the metal complex. In some embodiments, there are 1 to 3 such anionic metal carbonyls balancing the charge of the metal complex.

In some embodiments, where carbonylation catalysts used in methods described herein include a cationic metal complex, the metal complex has the formula $[(L^c)_vM_b]^{z+}$, where:
  $L^c$ is a ligand where, when two or more $L^c$ are present, each may be the same or different;
  M is a metal atom where, when two M are present, each may be the same or different;
  v is an integer from 1 to 4 inclusive;
  b is an integer from 1 to 2 inclusive; and z is an integer greater than 0 that represents the cationic charge on the metal complex.

In some embodiments, provided Lewis acids conform to structure I:

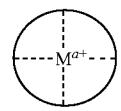

wherein:
  ⊕ is a multidentate ligand;
  M is a metal atom coordinated to the multidentate ligand;
  a is the charge of the metal atom and ranges from 0 to 2; and In some embodiments, provided metal complexes conform to structure II:

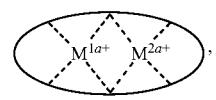

where a is as defined above (each a may be the same or different), and
  $M^1$ is a first metal atom;
  $M^2$ is a second metal atom; and
  ⟲ comprises a multidentate ligand system capable of coordinating both metal atoms.

For sake of clarity, and to avoid confusion between the net and total charge of the metal atoms in complexes I and II and other structures herein, the charge ($a^+$) shown on the metal atom in complexes I and II above represents the net charge on the metal atom after it has satisfied any anionic sites of the multidentate ligand. For example, if a metal atom in a complex of formula I were Cr(II), and the ligand were porphyrin (a tetradentate ligand with a charge of −2), then the chromium atom would have a net charge of +1, and a would be 1.

Suitable multidentate ligands include, for example, porphyrin ligands 1, salen ligands 2, dibenzotetramethyltetraaza[14]annulene (tmtaa) ligands 3, phthalocyaninate ligands 4, the Trost ligand 5, tetraphenylporphyrin ligands 6, and corrole ligands 7. In some embodiments, the multidentate ligand is a salen ligands. In other embodiments, the multidentate ligand is a porphyrin ligands. In other embodiments, the multidentate ligand is a tetraphenylporphyrin ligands. In other embodiments, the multidentate ligand is a corrole ligands. Any of the foregoing ligands can be unsubstituted or can be substituted. Numerous variously substituted analogs of these ligands are known in the art and will be apparent to the skilled artisan.

1

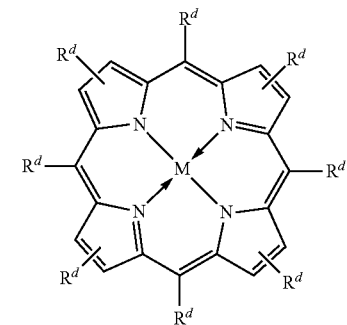

2

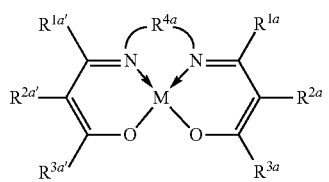

3

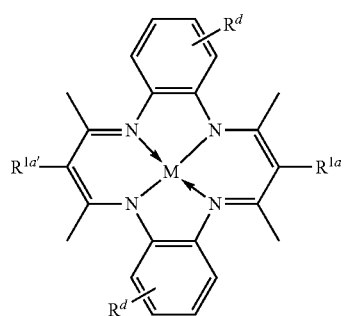

4

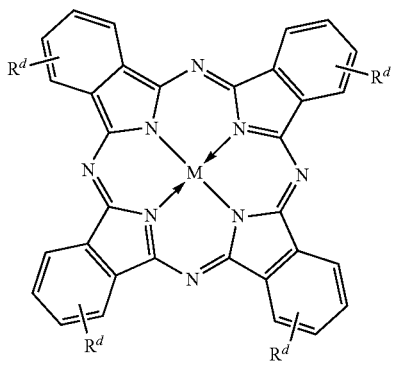

5

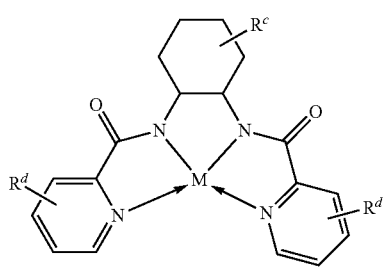

6

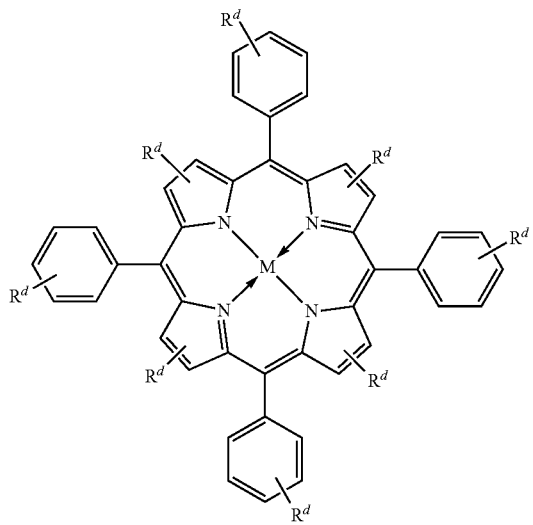

7

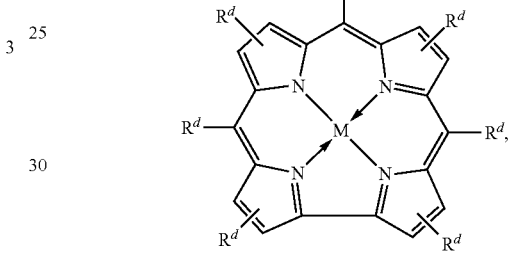

wherein each of $R^c$, $R^d$, $R^{1a}$, $R^{2a}$, $R^{3a}$, $R^{4a}$, $R^{1a'}$, $R^{2a'}$, $R^{3a'}$, and M, is as defined and described in the classes and subclasses herein.

In some embodiments, Lewis acids provided carbonylation catalysts used in methods described herein comprise metal-porphinato complexes. In some embodiments, the moiety ⊕ has the structure:

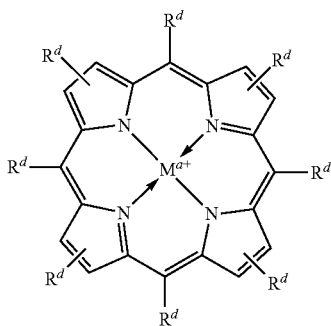

wherein each of M and a is as defined above and described in the classes and subclasses herein, and $R^d$ at each occurrence is independently hydrogen, halogen, —$OR^4$, —$NR^y_2$, —$SR^y$, —CN, —$NO_2$, —$SO_2R^y$, —$SOR^y$, —$SO_2NR^y_2$; —CNO, —$NR^ySO_2R^y$, —NCO, —$N_3$, —$SiR^y_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, and sulfur; and 4- to 7-membered heterocyclic having 1-2 heteroatoms independently selected from the group consisting of nitrogen, oxygen, and sulfur, where two or more $R^d$ groups may be taken together to form one or more optionally substituted rings, each $R^y$ is independently hydrogen, an optionally substituted group selected the group consisting of acyl; carbamoyl, arylalkyl; 6- to 10-membered aryl; $C_{1-12}$ aliphatic; $C_{1-12}$ heteroaliphatic having 1-2 heteroatoms independently selected from the group consisting of nitrogen, oxygen, and sulfur; 5- to 10-membered heteroaryl having 1-4 heteroatoms independently selected from the group consisting of nitrogen, oxygen, and sulfur; 4- to 7-membered heterocyclic having 1-2 heteroatoms independently selected from the group consisting of nitrogen, oxygen, and sulfur; an oxygen protecting group; and a nitrogen protecting group; two $R^y$ on the same nitrogen atom are taken with the nitrogen atom to form an optionally substituted 4- to 7-membered heterocyclic ring having 0-2 additional heteroatoms independently selected from the group consisting of nitrogen, oxygen, and sulfur; and each $R^4$ is independently is a hydroxyl protecting group or $R^y$.

In some embodiments, the moiety ⊖ has the structure:

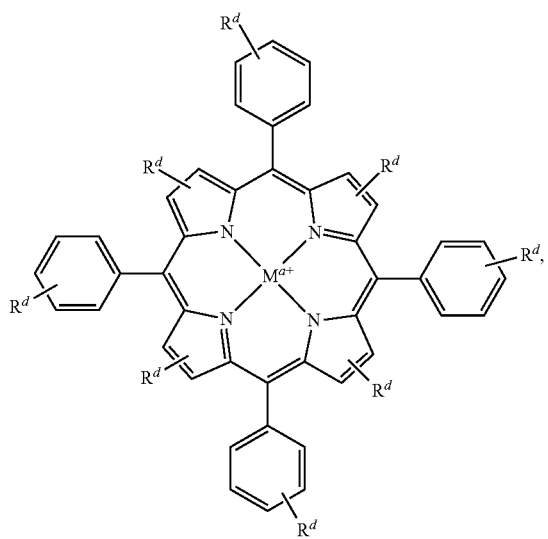

where M, a and $R^d$ are as defined above and in the classes and subclasses herein.

In some embodiments, the moiety ⊖ has the structure:

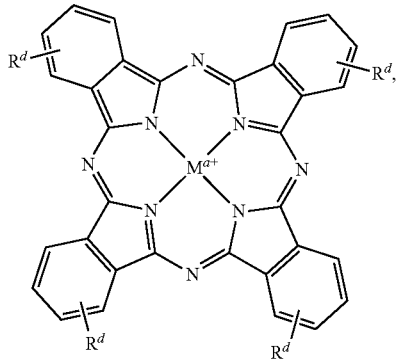

where M, a and $R^d$ are as defined above and in the classes and subclasses herein.

In some embodiments, Lewis acids included in carbonylation catalysts used in methods described herein comprise metallo salenate complexes. In some embodiments, the moiety ⊖ has the structure:

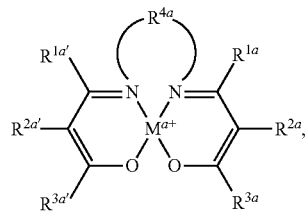

wherein:

M, and a are as defined above and in the classes and subclasses herein.

$R^{1a}$, $R^{1a'}$, $R^{2a}$, $R^{2a'}$, $R^{3a}$, and $R^{3a'}$ are independently hydrogen, halogen, —$OR^4$, —$NR^y_2$, —$SR^y$, —CN, —$NO_2$, —$SO_2R^y$, —$SOR^y$, —$SO_2NR^y_2$; —CNO, —$NR^y SO_2 R^y$, —NCO, —$N_3$, —$SiR^y_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, and sulfur; and 4- to 7-membered heterocyclic having 1-2 heteroatoms independently selected from the group consisting of nitrogen, oxygen, and sulfur; wherein each $R^4$, and $R^y$ is independently as defined above and described in classes and subclasses herein, wherein any of ($R^{2a'}$ and $R^{3a'}$), ($R^{2a}$ and $R^{3a}$), ($R^{1a}$ and $R^{2a}$), and ($R^{1a'}$ and $R^{2a'}$) may optionally be taken together with the carbon atoms to which they are attached to form one or more rings which may in turn be substituted with one or more $R^y$ groups; and $R^{4a}$ is selected from the group consisting of:

e)
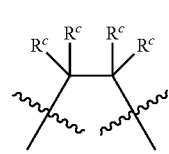

f)
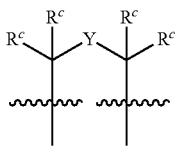

g)
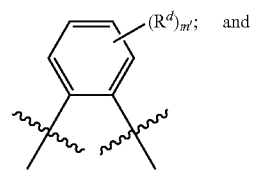

and

-continued

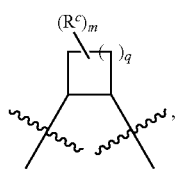

h)

where
R$^c$ at each occurrence is independently hydrogen, halogen, —OR$^4$, —NR$^y$$_2$, —SR$^y$, —CN, —NO$_2$, —SO$_2$R$^y$, —SOR$^y$, —SO$_2$NR$^y$$_2$; —CNO, —NR$^y$SO$_2$R$^y$, —NCO, —N$_3$, —SiR$^y$$_3$; or an optionally substituted group selected from the group consisting of C$_{1-20}$ aliphatic; C$_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, and sulfur; and 4- to 7-membered heterocyclic having 1-2 heteroatoms independently selected from the group consisting of nitrogen, oxygen, and sulfur;
wherein:
two or more R$^c$ groups may be taken together with the carbon atoms to which they are attached and any intervening atoms to form one or more rings;
when two R$^c$ groups are attached to the same carbon atom, they may be taken together along with the carbon atom to which they are attached to form a moiety selected from the group consisting of: a 3- to 8-membered spirocyclic ring, a carbonyl, an oxime, a hydrazone, an imine; and an optionally substituted alkene;
wherein R$^4$ and R$^y$ are as defined above and in classes and subclasses herein;
Y is a divalent linker selected from the group consisting of: —NR$^y$—, —N(R$^y$)C(O)—, —C(O)NR$^y$—, —O—, —C(O)—, —OC(O)—, —C(O)O—, —S—, —SO—, —SO$_2$—, —C(=S)—, —C(=NR$^y$)—, —N=N—; a polyether; a C$_3$ to C$_8$ substituted or unsubstituted carbocycle; and a C$_1$ to C$_8$ substituted or unsubstituted heterocycle;
m' is 0 or an integer from 1 to 4, inclusive;
q is 0 or an integer from 1 to 4, inclusive; and
x is 0, 1, or 2.

In some embodiments, a provided Lewis acid comprises a metallo salen compound, as shown in formula Ia:

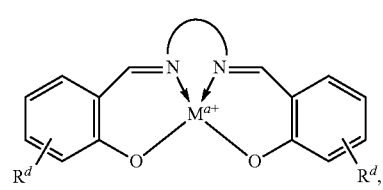

Ia wherein each of M, R$^d$, and a, is as defined above and in the classes and subclasses herein, ⌢ represents is an optionally substituted moiety linking the two nitrogen atoms of the diamine portion of the salen ligand, where ⌢ is selected from the group consisting of a C$_3$-C$_{14}$ carbocycle, a C$_6$-C$_{10}$ aryl group, a C$_3$-C$_{14}$ heterocycle, and a C$_5$-C$_{10}$ heteroaryl group; or an optionally substituted C$_{2-20}$ aliphatic group, wherein one or more methylene units are optionally and independently replaced by —NR$^y$—, —N(R$^y$)C(O)—, —C(O)N(R$^y$)—, —OC(O)N(R$^y$)—, —N(R$^y$)C(O)O—, —OC(O)O—, —O—, —C(O)—, —OC(O)—, —C(O)O—, —S—, —SO—, —SO$_2$—, —C(=S)—, —C(=NR$^y$)—, —C(=NOR$^y$)— or —N=N—.

In some embodiments metal complexes having formula Ia above, at least one of the phenyl rings comprising the salicylaldehyde-derived portion of the metal complex is independently selected from the group consisting of:

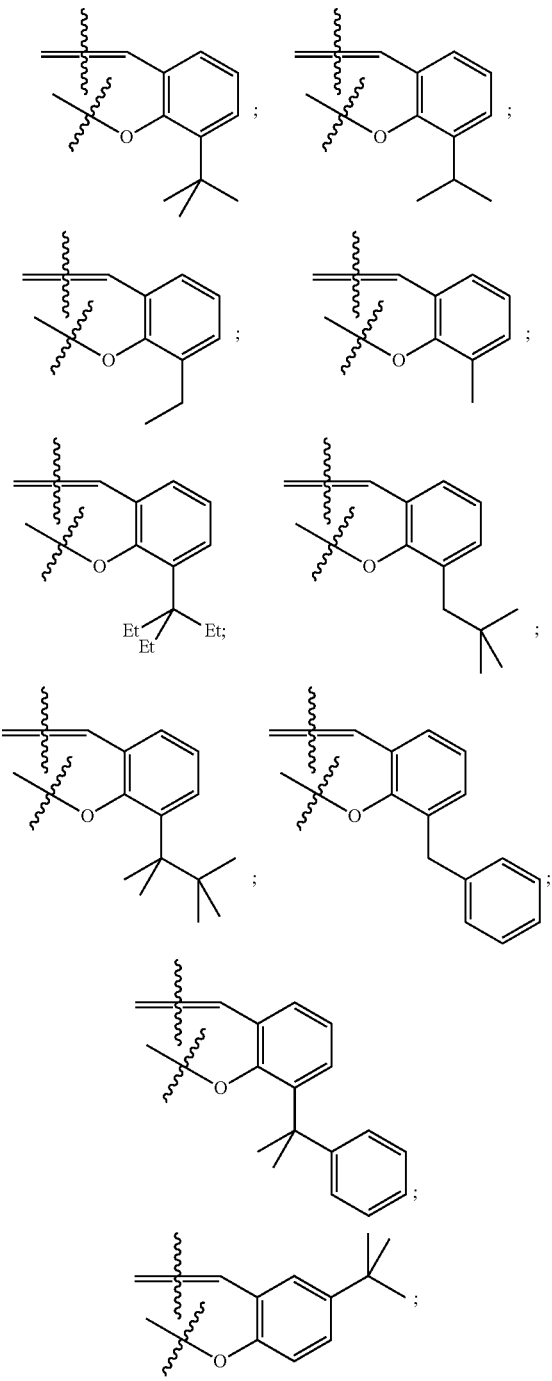

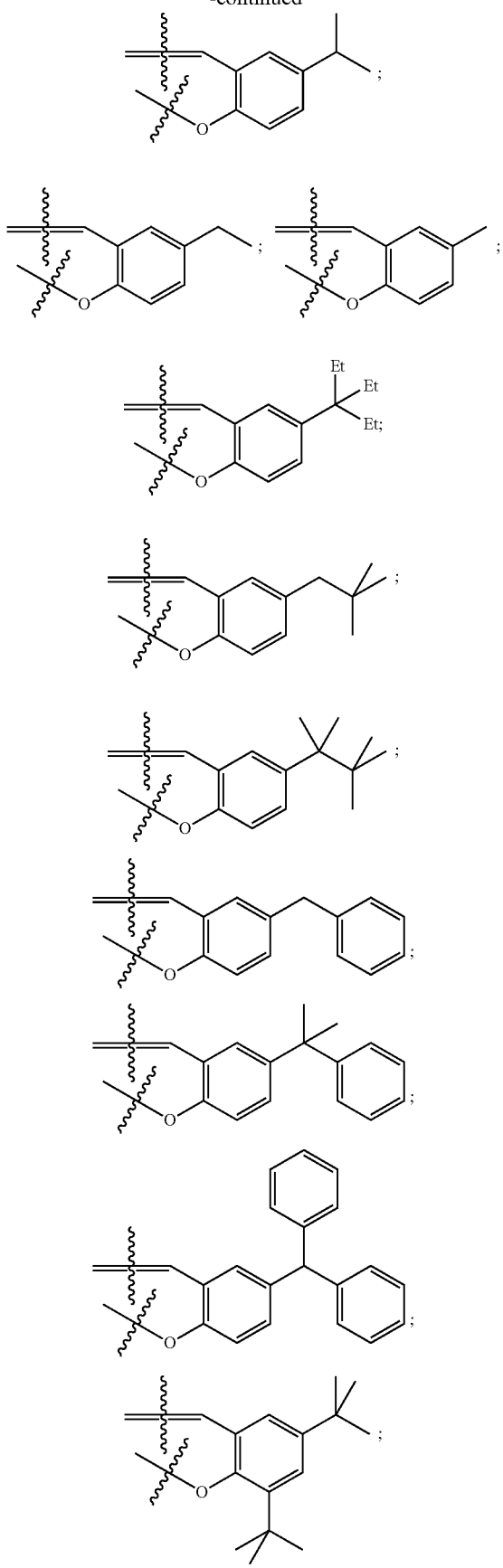
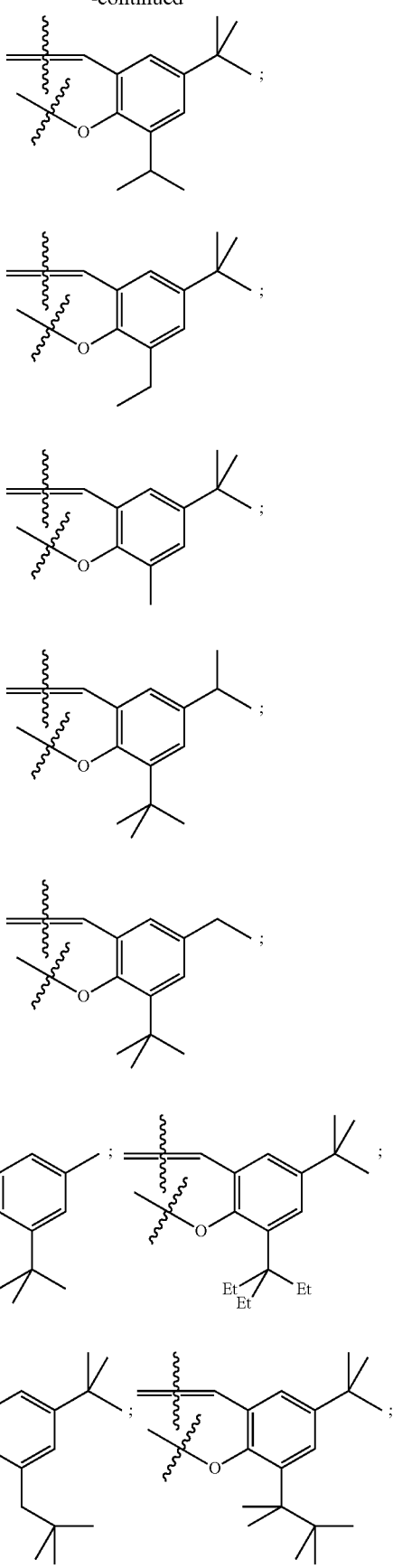

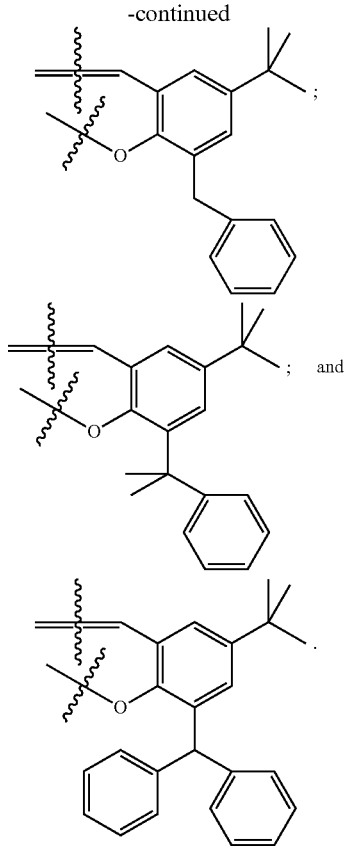

In some embodiments, a provided Lewis acid comprises a metallo salen compound, conforming to one of formulae Va or Vb:

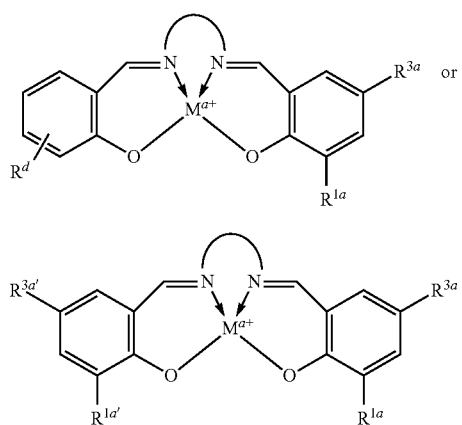

where M, a, $R^d$, $R^{1a}$, $R^{3a}$, $R^{1a'}$, $R^{3a'}$, and ⌒, are as defined above and in the classes and subclasses herein.

In some embodiments of metal complexes having formulae Va or Vb, each $R^{1a}$ and $R^{3a}$ is, independently, optionally substituted $C_1$-$C_{20}$ aliphatic.

In some embodiments, the moiety ⌒ comprises an optionally substituted 1,2-phenyl moiety.

In some embodiments, Lewis acids included in carbonylation catalysts used in methods described herein comprise metal-tmtaa complexes. In some embodiments, the moiety ⊖ has the structure:

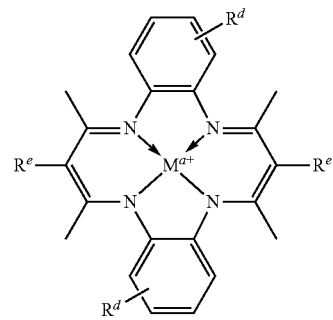

where M, a and $R^d$ are as defined above and in the classes and subclasses herein, and Re at each occurrence is independently hydrogen, halogen, —OR, —$NR^y_2$, —$SR^y$, —CN, —$NO_2$, —$SO_2R^y$, —$SOR^y$, —$SO_2NR^y_2$; —CNO, —$NR^ySO_2R$, —NCO, —$N_3$, —$SiR^y_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, and sulfur; and 4- to 7-membered heterocyclic having 1-2 heteroatoms independently selected from the group consisting of nitrogen, oxygen, and sulfur.

In some embodiments, the moiety ⊖ has the structure:

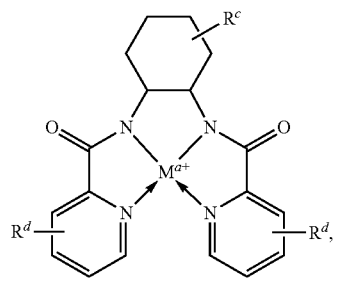

where each of M, a, $R^c$ and $R^d$ is as defined above and in the classes and subclasses herein.

In some embodiments, where carbonylation catalysts used in methods described herein include a Lewis acidic metal complex, the metal atom is selected from the periodic table groups 2-13, inclusive. In some embodiments, M is a transition metal selected from the periodic table groups 4, 6, 11, 12 and 13. In some embodiments, M is aluminum, chromium, titanium, indium, gallium, zinc cobalt, or copper. In some embodiments, M is aluminum. In other embodiments, M is chromium.

In some embodiments, M has an oxidation state of +2. In some embodiments, M is Zn(II), Cu(II), Mn(II), Co(II), Ru(II), Fe(II), Co(II), Rh(II), Ni(II), Pd(II) or Mg(II). In some embodiments M is Zn(II). In some embodiments M is Cu(II).

In some embodiments, M has an oxidation state of +3. In some embodiments, M is Al(III), Cr(III), Fe(III), Co(III), Ti(III), In(III), Ga(III) or Mn(III). In some embodiments M is Al(III). In some embodiments M is Cr(III).

In some embodiments. M has an oxidation state of +4. In some embodiments, M is Ti(IV) or Cr(IV).

In some embodiments, $M^1$ and $M^2$ are each independently a metal atom selected from the periodic table groups 2-13, inclusive. In some embodiments, M is a transition metal selected from the periodic table groups 4, 6, 11, 12 and 13. In some embodiments, M is aluminum, chromium, titanium, indium, gallium, zinc cobalt, or copper. In some embodiments, M is aluminum. In other embodiments, M is chromium. In some embodiments, $M^1$ and $M^2$ are the same. In some embodiments, $M^1$ and $M^2$ are the same metal, but have different oxidation states. In some embodiments, $M^1$ and $M^2$ are different metals.

In some embodiments, one or more of $M^1$ and $M^2$ has an oxidation state of +2. In some embodiments, $M^1$ is Zn(II), Cu(II), Mn(II), Co(II), Ru(II), Fe(II), Co(II), Rh(II), Ni(II), Pd(II) or Mg(II). In some embodiments $M^1$ is Zn(II). In some embodiments $M^1$ is Cu(II). In some embodiments, $M^2$ is Zn(II), Cu(II), Mn(II), Co(II), Ru(II), Fe(II), Co(II), Rh(II), Ni(II), Pd(II) or Mg(II). In some embodiments $M^2$ is Zn(II). In some embodiments $M^2$ is Cu(II).

In some embodiments, one or more of $M^1$ and $M^2$ has an oxidation state of +3. In some embodiments, $M^1$ is Al(III), Cr(III), Fe(III), Co(III), Ti(III) In(III), Ga(III) or Mn(III). In some embodiments $M^1$ is Al(III). In some embodiments $M^1$ is Cr(III). In some embodiments, $M^2$ is Al(III), Cr(III), Fe(III), Co(III), Ti(III) In(III), Ga(III) or Mn(III). In some embodiments $M^2$ is Al(III). In some embodiments $M^2$ is Cr(III).

In some embodiments, one or more of $M^1$ and $M^2$ has an oxidation state of +4. In some embodiments, $M^1$ is Ti(IV) or Cr(IV). In some embodiments, $M^2$ is Ti(IV) or Cr(V).

In some embodiments, the metal-centered Lewis-acidic component of the carbonylation catalyst includes a dianionic tetradentate ligand. In some embodiments, the dianionic tetradentate ligand is selected from the group consisting of: porphyrin ligand; salen ligand; dibenzotetramethyltetraaza[14]annulene (tmtaa) ligand; phthalocyaninate ligand; and the Trost ligand.

In some embodiments, the carbonylation catalyst includes a carbonyl cobaltate in combination with an aluminum porphyrin compound. In some embodiments, the carbonylation catalyst is $[(TPP)Al(THF)_2][Co(CO)_4]$ where TPP stands for tetraphenylporphyrin and THF stands for tetrahydrofuran.

In some embodiments, the carbonylation catalyst includes a carbonyl cobaltate in combination with a chromium porphyrin compound.

In some embodiments, the carbonylation catalyst includes a carbonyl cobaltate in combination with a chromium salen compound. In some embodiments, the carbonylation catalyst includes a carbonyl cobaltate in combination with a chromium salophen compound.

In some embodiments, the carbonylation catalyst includes a carbonyl cobaltate in combination with an aluminum salen compound. In some embodiments, the carbonylation catalyst includes a carbonyl cobaltate in combination with an aluminum salophen compound.

In some embodiments, one or more neutral two electron donors coordinate to M $M^1$ or $M^2$ and fill the coordination valence of the metal atom. In some embodiments, the neutral two electron donor is a solvent molecule. In some embodiments, the neutral two electron donor is an ether. In some embodiments, the neutral two electron donor is tetrahydrofuran, diethyl ether, acetonitrile, carbon disulfide, or pyridine. In some embodiments, the neutral two electron donor is tetrahydrofuran. In some embodiments, the neutral two electron donor is an epoxide. In some embodiments, the neutral two electron donor is an ester or a lactone.

Carbonylation Solvent Removal

As generally described above, the methods described herein comprise removal of one or more carbonylation solvents from process streams described herein. In some embodiments, such solvent removal occurs in a carbonylation solvent removal zone. In some embodiments, a carbonylation solvent removal zone comprises a distiller. In some embodiments, a distillation column is used to distill a carbonylation solvent away from BPL. In some embodiments, a reaction zone is or comprises a reactive distillation column. In some embodiments, provided methods comprise withdrawing a distillation stream of a carbonylation solvent. In some embodiments, a carbonylation solvent has a boiling point below 160° C. at 1 atm. In some variations, the carbonylation solvent has a boiling point, at 1 atm, below 150° C., below 140° C., below 130° C., below 120° C., below 110° C., below 100° C., below 90° C., or below 80° C.; or between 60° C. and 160° C., between 60° C. and 150° C., between 60° C. and 140° C., between 60° C. and 130° C., between 60° C. and 120° C., between 60° C. and 110° C., between 60° C. and 110° C., between 60 OC and 100° C., between 60° C. and 90° C. between 60° C. and 80° C., between 70° C. and 160° C. between 70° C. and 150° C., between 70° C. and 140° C. between 70° C. and 130° C., between 70° C. and 120° C., between 70° C. and 110° C., between 70° C. and 110° C., between 70° C. and 100° C., between 70° C. and 90° C., or between 70° C. and 80° C. In some embodiments, a distillation stream of a carbonylation solvent is directed to a first reaction zone and optionally mixed with feedstock streams of EO and/or carbon monoxide prior to the first reaction zone. In some embodiments, a provided method further comprises withdrawing a distillation stream of a second carbonylation solvent.

BPL Conversion to PPL

In some embodiments, a product stream comprising BPL enters a reaction zone described herein as a gas or as a liquid. The conversion of BPL to PPL may be performed in either the gas phase or the liquid phase and may be performed neat, or in the presence of a carrier gas, solvent, or other diluent. In some embodiments, a BPL feedstock stream is neat when introduced into a second reaction zone.

It will be appreciated that in certain embodiments, the methods and systems described herein can also be directly integrated to the formation of ethylene oxide, thus avoiding the isolation and storage of this toxic and potentially explosive intermediate. In certain embodiments, the processes described herein are fed by ethylene gas which is converted to ethylene oxide, the ethylene oxide then feeds a subsequent reaction where carbonylation takes place to yield a feedstock stream comprising BPL.

In certain embodiments, conversion of BPL to PPL is performed in a continuous flow format. In certain embodiments, conversion of BPL to PPL is performed in a continuous flow format in the gas phase. In certain embodiments, conversion of BPL to PPL is performed in a continuous flow format in the liquid phase. In certain embodiments, conversion of BPL to PPL is performed in a liquid phase in a batch or semi-batch format. Conversion of BPL to PPL may be performed under a variety of conditions. In certain embodiments, the reaction may be performed in the presence of one or more catalysts that facilitate the transformation of the BPL to PPL.

In certain embodiments, a feedstock stream comprising BPL is directed to a reaction zone where it is contacted with a suitable catalyst and where at least a portion of the BPL is converted to PPL. In some embodiments, the reaction zone is maintained at a temperature suitable for the formation of PPL. In some embodiments, such temperature maintenance comprises the removal of heat from the reaction zone.

In some embodiments, a feedstock stream comprising BPL is directed to a second reaction zone where it is contacted with a suitable catalyst and where at least a portion of the BPL is converted to a PPL product stream. In some embodiments, the second reaction zone is maintained at a temperature suitable for the formation of PPL. In some embodiments, such temperature maintenance comprises the removal of heat from the second reaction zone.

In certain embodiments, conversion of BPL to PPL utilizes a solid carboxylate catalyst and the conversion is conducted at least partially in the gas phase. In certain embodiments, the solid carboxylate catalyst in the beta lactone conversion stage comprises a solid acrylic acid catalyst. In certain embodiments, BPL is introduced as a liquid and contacted with a solid carboxylate catalyst to form PPL. In other embodiments, BPL is introduced as a gas and contacted with a solid carboxylate catalyst to form PPL.

In certain embodiments of the processes described herein, the feed rates, reaction rates, and reactor sizes are scaled such that each subsequent stage in the process can utilize essentially all of the effluent from the previous stage. In certain embodiments, the methods include one or more steps of modulating one or more system parameters selected from the group consisting of: the ethylene and oxygen feed rates and/or ratios, the ethylene oxidation zone reaction temperature, the carbon monoxide feed rate, the carbonylation stage temperature, the carbonylation stage reaction pressure, the feed rate of one or more reactants entering the second reaction zone, the temperature and/or pressure of the second reaction zone, and a combination of any two or more of these parameters. In certain embodiments, this modulation of system parameters is performed such that the conversion rate per unit time of each stage matches that of the previous stage so that the effluent of the previous stage may be used directly to feed the subsequent stage. In certain embodiments, methods include one or more steps of analyzing the effluent from one or more stages to assess its content. In certain embodiments, such analyzing steps include performing spectroscopy (e.g., infrared spectroscopy, nuclear magnetic resonance spectroscopy, ultraviolet or visible light spectroscopy and the like), chromatography (e.g., gas or liquid chromatography). In certain embodiments, such analyses are performed in a flow-through or stop-flow mode that provides real-time data on the chemical composition of the effluent. In certain embodiments, such data are used to provide a prompt to adjust one or more of the system parameters described above.

As described above, in some embodiments, at least a portion of BPL is converted to a PPL product stream in a second reaction zone. In some embodiments, the temperature of a second reaction zone is maintained at or below the pyrolysis temperature of polypropiolactone. In some embodiments, the temperature of a second reaction zone is maintained at or below about 150° C. In some embodiments, the temperature of second reaction zone is maintained at about 0° C. to about 150° C. In some embodiments, the temperature of a second reaction zone is maintained at about 25° C. to about 150° C. In some embodiments, the temperature of a second reaction zone is maintained at about 50° C. to about 150° C. In some embodiments, the temperature of a second reaction zone is maintained at about 75° C. to about 150° C. In some embodiments, the temperature of a second reaction zone is maintained at about 100° C. to about 150° C. In some embodiments, the temperature of a second reaction zone is maintained at about 0° C. to about 100° C. In some embodiments, the temperature of a second reaction zone is maintained at about 50° C. to about 100° C.

PPL Pyrolysis

In some embodiments, the methods described herein may further comprise converting PPL to acrylic acid. In some embodiments, the PPL formed by polymerization of BPL is concurrently converted to acrylic acid (e.g., GAA) via pyrolysis in the second reaction zone. In some embodiments, the second reaction zone containing the reaction of BPL to PPL is maintained at a temperature at or above the pyrolysis temperature of PPL such that the thermal decomposition of PPL produces acrylic acid. Without wishing to be bound by any particular theory, it is believed that in such embodiments as BPL reacts with acrylic acid to start polymer chains, thermal decomposition will degrade the polymer to acrylic acid.

In certain embodiments, a PPL product stream described above as forming in a second reaction zone is directed to third reaction zone, wherein the third reaction zone is maintained at a temperature at or above the pyrolysis temperature of PPL such that the thermal decomposition of PPL produces acrylic acid. In some embodiments, the temperature of a second reaction zone is different than the temperature of a third reaction zone. In some embodiments, the temperature of a second reaction zone is below the pyrolysis temperature of PPL. In some embodiments, the PPL product stream entering a third reaction zone comprises an amount of unreacted BPL. In other words, the formation of PPL need not be complete prior to a PPL product stream entering a third reaction zone, and in such cases BPL may undergo polymerization to PPL followed by pyrolysis within the third reaction zone.

In some embodiments, BPL conversion to acrylic acid proceeds in the second reaction zone, which can be operated within a variety of temperature and pressure ranges. In some embodiments, the temperature can range from about 150° C. to about 300° C. In some embodiments, the temperature ranges from about 150° C. to about 200° C. In some embodiments, the temperature ranges from about 150° C. to about 250° C. In some embodiments, the temperature ranges from about 175° C. to about 300° C. In some embodiments, the temperature ranges from about 200° C. to about 250° C. In some embodiments, the temperature ranges from about 225° C. to about 275° C. In some embodiments, the temperature ranges from about 250° C. to about 300° C. In some embodiments, the temperature ranges from about 200° C. to about 300° C.

In some embodiments, pyrolysis proceeds in a third reaction zone and the third reaction zone is maintained at a temperature at or above the pyrolysis temperature of polypropiolactone. In some embodiments, the temperature of a third reaction zone is maintained at or above about 150° C. In some embodiments, the temperature of a third reaction zone is maintained at or above about 160° C. In some embodiments, the temperature of a third reaction zone is maintained at or above about 175° C. In some embodiments, the temperature of a third reaction zone is maintained at or above about 200° C. In some embodiments, the temperature of a third reaction zone is maintained at or above about 225° C. In some embodiments, the temperature of a third reaction zone is maintained at or above about 250° C. In some embodiments, the temperature of a third reaction zone is maintained at or above about 275° C.

In some embodiments, the pressure used in provided methods and systems can range from about 0.01 atmospheres to about 500 atmospheres (absolute). In some embodiments, the pressure can range from about 0.01 atmospheres to about 10 atmospheres (absolute). In some embodiments, the pressure can range from about 0.01 atmospheres to about 50 atmospheres (absolute). In some embodiments, the pressure can range from about 1 atmosphere to about 10 atmospheres (absolute). In some embodiments, the pressure can range from about 1 atmosphere to about 50 atmospheres (absolute). In some embodiments, the pressure can range from about 1 atmosphere to about 100 atmospheres (absolute). In some embodiments, the pressure can range from about 10 atmospheres to about 50 atmospheres (absolute). In some embodiments, the pressure can range from about 10 atmospheres to about 100 atmospheres (absolute). In some embodiments, the pressure can range from about 50 atmospheres to about 100 atmospheres (absolute). In some embodiments, the pressure can range from about 50 atmospheres to about 200 atmospheres (absolute). In some embodiments, the pressure can range from about 100 atmospheres to about 200 atmospheres (absolute). In some embodiments, the pressure can range from about 100 atmospheres to about 250 atmospheres (absolute). In some embodiments, the pressure can range from about 200 atmospheres to about 300 atmospheres (absolute). In some embodiments, the pressure can range from about 200 atmospheres to about 500 atmospheres (absolute). In some embodiments, the pressure can range from about 250 atmospheres to about 500 atmospheres (absolute).

Reaction Zones

As used herein, the term "reaction zone" refers to a reactor or portion thereof where a particular reaction occurs. A given reaction may occur in multiple reaction zones, and different reaction zones may comprise separate reactors or portions of the same reactor. A "reactor" typically comprises one or more vessels with one or more connections to other reactors or system components.

In some embodiments of provided methods and systems, a second reaction zone is comprised within an extruder reactor. In some embodiments, a second reaction zone is a reactive extruder. In some embodiments of provided methods and systems, a second and third reaction zone is comprised within an extruder reactor. In some embodiments, an extruder reactor provides a temperature gradient between a second reaction zone and third reaction zone. It will be appreciated that the temperature of a second reaction zone can be lower than that of a third reaction zone due to the relative temperatures needed to carry out each reaction therein. In some embodiments, an extruder reactor provides a temperature in a second reaction zone of about 0° C. to about 150° C., and a temperature in a third reaction zone of about 150° C. to about 300° C. In some embodiments, the terminal temperature of an extruder is at or above the pyrolysis temperature of PPL.

Ethylene Oxide

The provided methods and systems optionally further include, at their upstream end, an oxidative reactor that produces ethylene oxide (EO) on-site and provides EO to the central reactor. In certain embodiments, EO is obtained directly from the gas phase oxidation of ethylene. This embodiment is advantageous in that it avoids the need to isolate, store, and transport ethylene oxide which is both toxic and explosive. In certain embodiments, the ethylene oxide is maintained in the gas phase as produced and fed to the central reactor without condensing it to a liquid. In other embodiments, ethylene oxide is fed to a carbonylation reaction as a liquid.

Thus, in certain embodiments, provided methods and systems further comprise an oxidative reactor, comprising an inlet fed by ethylene, an oxidative reaction zone that converts at least some of the ethylene to EO, and an outlet which provides an outlet stream comprising the EO, which is then a feedstock stream comprising EO for carbonylation.

Carbon Monoxide

Carbon monoxide can be provided either as a pure stream or as a mixture of carbon monoxide and one or more additional gasses. In some embodiments, carbon monoxide is provided in a mixture with hydrogen (e.g., syngas). The ratio of carbon monoxide and hydrogen can be any ratio, including for example 1:1, 1:2, 1:4, 1:10, 10:1, 4:1, or 2:1 or within any range with these ratios as end points. In some embodiments, the carbon monoxide is provided in mixture with gases as an industrial process gas. The carbon monoxide sources include for example wood gas, producer gas, coal gas, town gas, manufactured gas, hygas, Dowson gas or water gas, among others. In some embodiments, the carbon monoxide is provided at super-atmospheric pressure.

Polymerization Catalysts

As described above, polymerizing the BPL to PPL proceeds in the presence of a suitable polymerization catalyst. Many catalysts are known for the ring-opening polymerization of beta lactones. Any such catalyst can be employed in the present process.

Catalysts suitable for the ring-opening polymerization step of the methods disclosed herein are disclosed, for example, in: Journal of the American Chemical Society (2002), 124(51), 15239-15248 *Macromolecules*, vol. 24, No. 20, pp. 5732-5733, *Journal of Polymer Science*, Part A-1, vol. 9, No. 10, pp. 2775-2787; Inoue, S., Y. Tomoi, T. Tsuruta & J. Furukawa; *Macromolecules*, vol. 26, No. 20, pp. 5533-5534; *Macromolecules*, vol. 23, No. 13, pp. 3206-3212; *Polymer Preprints* (1999), 40(1), 508-509; *Macromolecules*, vol. 21, No. 9, pp. 2657-2668; and *Journal of Organometallic Chemistry*, vol. 341, No. 1-3. pp. 83-9; and in U.S. Pat. Nos. 3,678,069, 3,169,945, 6,133,402; 5,648,452; 6,316.590; 6,538,101; and 6,608,170.

Polymerization of lactones to polyester can be performed with a number of polymerization initiators including, for example, alcohols, amines, polyols, polyamines, and diols, amongst others. Further, a variety of catalysts may be used in the polymerization reaction, including for example metals (e.g., lithium, sodium, potassium, magnesium, calcium, zinc, aluminum, titanium, cobalt, etc.) metal oxides, carbonates of alkali- and alkaline earth metals, borates, silicates, of various metals. In some variations, catalysts that may be used in the polymerization reaction, include for example metals (e.g., lithium, sodium, potassium, magnesium, calcium, zinc, aluminum, titanium, cobalt, etc.) metal oxides, salts of alkali and alkaline earth metals (such as carbonates, borates, hydroxides, alkoxides, and carboxylates), and borates, silicates, or salts of other metals.

In certain embodiments, suitable polymerization catalysts include carboxylate salts of metal ions or organic cations. In some embodiments, a carboxylate salt is other than a carbonate.

In certain embodiments, the polymerization catalyst is combined with BPL in a molar ratio up to about 1:100,000 polymerization catalyst:BPL. In certain embodiments, the ratio is from about 1:100,000 to about 25:100 polymerization catalyst:BPL. In certain embodiments, the polymerization catalyst is combined with BPL in a molar ratio of about 1:50,000 polymerization catalyst:BPL to about 1:25,000 polymerization catalyst:BPL. In certain embodiments, the polymerization catalyst is combined with BPL in a molar ratio of about 1:25,000 polymerization catalyst:BPL to about 1:10,000 polymerization catalyst:BPL. In certain embodiments, the polymerization catalyst is combined with BPL in a molar ratio of about 1:20,000 polymerization catalyst:BPL to about 1:10,000 polymerization catalyst:BPL. In certain embodiments, the polymerization catalyst is combined with BPL in a molar ratio of about 1:15,000 polymerization catalyst:BPL to about 1:5.000 polymerization catalyst:BPL. In certain embodiments, the polymerization catalyst is combined with BPL in a molar ratio of about 1:5,000 polymerization catalyst:BPL to about 1:1,000 polymerization catalyst:BPL. In certain embodiments, the polymerization catalyst is combined with BPL in a molar ratio of about 1:2,000 polymerization catalyst:BPL to about 1:500 polymerization catalyst:BPL. In certain embodiments, the polymerization catalyst is combined with BPL in a molar ratio of about 1:1,000 polymerization catalyst:BPL to about 1:200 polymerization catalyst:BPL. In certain embodiments, the polymerization catalyst is combined with BPL in a molar ratio of about 1:500 polymerization catalyst:BPL to about 1:100 polymerization catalyst:BPL. In certain embodiments the molar ratio of polymerization catalyst:BPL is about 1:50,000, 1:25,000, 1:15,000, 1:10,000, 1:5,000, 1:1,000, 1:500, 1:250 or a range including any two of these values. In certain embodiments the molar ratio of polymerization catalyst:BPL is about 1:100, 5:100, 10:100, 15:100, 20:100, 25:100 or a range including any two of these values. In certain embodiments, a polymerization catalyst is combined with BPL in a molar ratio of about 1:100 polymerization catalyst:BPL to about 25:100 polymerization catalyst:BPL. In certain embodiments, the molar ratio of polymerization catalyst:BPL is about 1:100, 5:100, 10:100, 15:100, 20:100, 25:100, or a range including any two of these ratios.

In certain embodiments, where the polymerization catalyst comprises a carboxylate salt, the carboxylate has a structure such that upon initiating polymerization of BPL, the polymer chains produced have an acrylate chain end. In certain embodiments, the carboxylate ion on a polymerization catalyst is the anionic form of a chain transfer agent used in the polymerization process.

In certain embodiments, the carboxylate salt of the polymerization catalyst is an acrylate salt (i.e., the anionic form) of a compound of Formula (I):

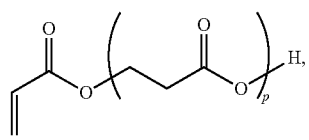

or a mixture of any two or more of these, where p is from 0 to 9. In certain embodiments, p is from 0 to 5. In certain embodiments, the carboxylate salt of the polymerization catalyst is an acrylate salt (i.e., of compound of Formula (I) where p=0).

In certain embodiments, the carboxylate salt of the polymerization catalyst is a salt of an acrylic acid dimer,

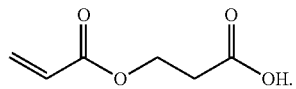

In certain embodiments, the carboxylate salt of the polymerization catalyst is a salt of an acrylic acid trimer,

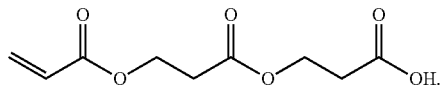

In certain embodiments, where the polymerization catalyst comprises a carboxylate salt, the carboxylate is the anionic form of a $C_{1-40}$ carboxylic acid. In certain embodiments, the carboxylate salt can be a salt of a polycarboxylic acid (e.g. a compound having two or more carboxylic acid groups). In certain embodiments, the carboxylate comprises the anion of a $C_{1-20}$ carboxylic acid. In certain embodiments, the carboxylate comprises the anion of a $C_{1-20}$ carboxylic acid. In certain embodiments, the carboxylate comprises the anion of a $C_{1-8}$ carboxylic acid. In certain embodiments, the carboxylate comprises the anion of a $C_{1-4}$ carboxylic acid. In certain embodiments, the carboxylate comprises the anion of an optionally substituted benzoic acid. In certain embodiments, the carboxylate is selected from the group consisting of: formate, acetate, propionate, valerate, butyrate, $C_{5-10}$ aliphatic carboxylate, and $C_{10-20}$ aliphatic carboxylate.

As noted, in certain embodiments, the polymerization catalyst comprises a carboxylate salt of an organic cation. In certain embodiments, the polymerization catalyst comprises a carboxylate salt of a cation wherein the positive charge is located at least partially on a nitrogen, sulfur, or phosphorus atom. In certain embodiments, the polymerization catalyst comprises a carboxylate salt of a nitrogen cation. In certain embodiments, the polymerization catalyst comprises a carboxylate salt of a cation selected from the group consisting of: ammonium, amidinium, guanidinium, a cationic form of a nitrogen heterocycle, and any combination of two or more of these. In certain embodiments, the polymerization catalyst comprises a carboxylate salt of a phosphorus cation. In certain embodiments, the polymerization catalyst comprises a carboxylate salt of a cation selected from the group consisting of phosphonium and phosphazenium. In certain embodiments, the polymerization catalyst comprises a carboxylate salt of a sulfur-containing cation. In certain embodiments, the polymerization catalyst comprises a sulfonium salt.

In certain embodiments, the polymerization catalyst comprises a carboxylate salt of a metal. In certain embodiments, the polymerization catalyst comprises a carboxylate salt of a alkali or alkaline earth metal. In certain embodiments, the polymerization catalyst comprises a carboxylate salt of an alkali metal. In certain embodiments, the polymerization catalyst comprises a carboxylate salt of sodium or potassium. In certain embodiments, the polymerization catalyst comprises a carboxylate salt of sodium.

In certain embodiments, the polymerization catalyst comprises a carboxylate salt of a protonated amine:

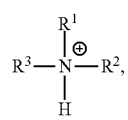

wherein:
each $R^1$ and $R^2$ is independently hydrogen or an optionally substituted radical selected from the group consisting of $C_{1-20}$ aliphatic; $C_{1-20}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; or an 8- to 14-membered polycyclic aryl ring; wherein $R^1$ and $R^2$ can be taken together with intervening atoms to form one or more optionally substituted rings optionally containing one or more additional heteroatoms;

each $R^3$ is independently hydrogen or an optionally substituted radical selected from the group consisting of $C_{1-20}$ aliphatic; $C_{1-20}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; or an 8- to 14-membered polycyclic aryl ring; wherein an $R^3$ group can be taken with an $R^1$ or $R^2$ group to form one or more optionally substituted rings.

In certain embodiments where the polymerization catalyst comprises a carboxylate salt of a protonated amine, the protonated amine is selected from the group consisting of:

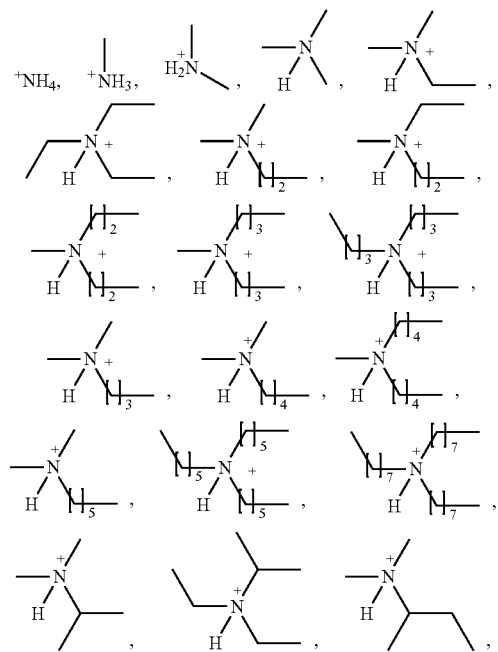

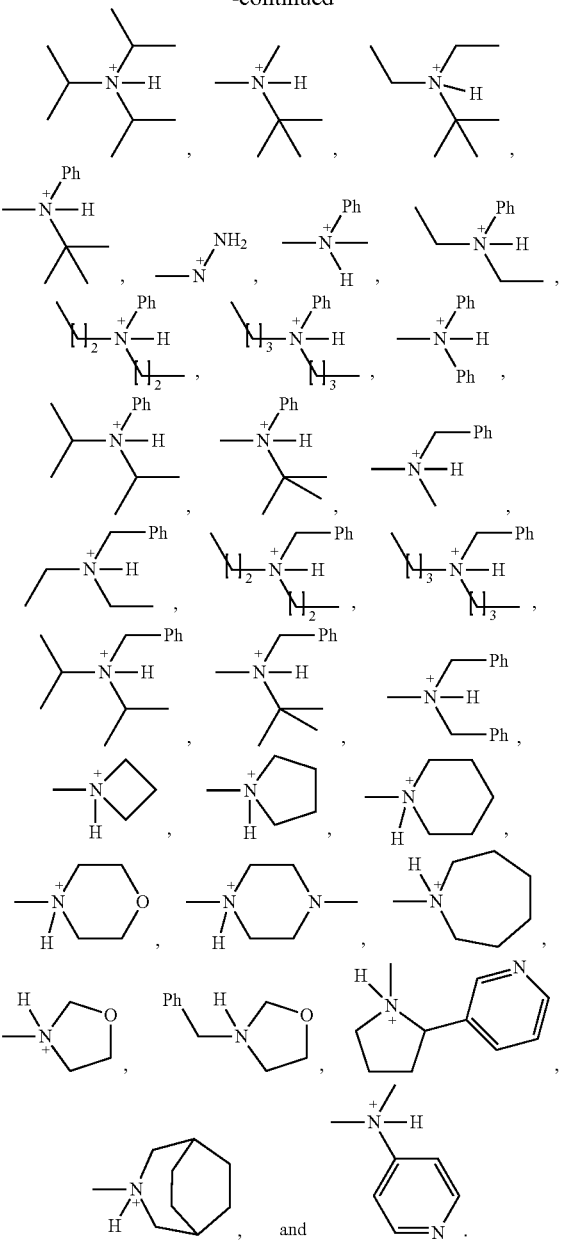

In certain embodiments, the polymerization catalyst comprises a carboxylate salt of a quaternary ammonium salt:

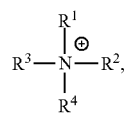

wherein:
each $R^1$, $R^2$ and $R^3$ is described above; and
each $R^4$ is independently hydrogen or an optionally substituted radical selected from the group consisting of $C_{1-20}$ aliphatic; $C_{1-20}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; or an 8- to 14-membered polycyclic aryl ring; wherein an $R^4$ group can be taken with an $R^1$, $R^2$ or $R^3$ group to form one or more optionally substituted rings.

In certain embodiments, a polymerization catalyst comprises a carboxylate salt of a guanidinium group:

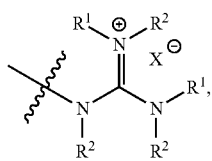

wherein each $R^1$ and $R^2$ is independently as defined above and described in classes and subclasses herein. In certain embodiments, each $R^1$ and $R^2$ is independently hydrogen or $C_{1-20}$ aliphatic. In certain embodiments, each $R^1$ and $R^2$ is independently hydrogen or $C_{1-12}$ aliphatic. In certain embodiments, each $R^1$ and $R^2$ is independently hydrogen or $C_{1-20}$ heteroaliphatic. In certain embodiments, each $R^1$ and $R^2$ is independently hydrogen or phenyl. In certain embodiments, each $R^1$ and $R^2$ is independently hydrogen or 8- to 10-membered aryl. In certain embodiments, each $R^1$ and $R^2$ is independently hydrogen or 5- to 10-membered heteroaryl. In certain embodiments, each $R^1$ and $R^2$ is independently hydrogen or 3- to 7-membered heterocyclic. In certain embodiments, one or more of $R^1$ and $R^2$ is optionally substituted $C_{1-12}$ aliphatic.

In certain embodiments, any two or more $R^1$ or $R^2$ groups are taken together with intervening atoms to form one or more optionally substituted carbocyclic, heterocyclic, aryl, or heteroaryl rings. In certain embodiments, $R^1$ and $R^2$ groups are taken together to form an optionally substituted 5- or 6-membered ring. In certain embodiments, three or more $R^1$ and/or $R^2$ groups are taken together to form an optionally substituted fused ring system.

In certain embodiments, an $R^1$ and $R^2$ group are taken together with intervening atoms to form a compound selected from:

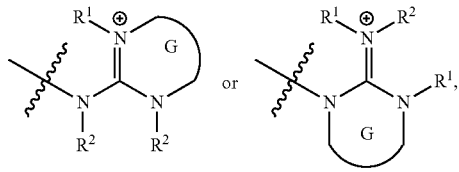

wherein each $R^1$ and $R^2$ is independently as defined above and described in classes and subclasses herein, and Ring G is an optionally substituted 5- to 7-membered saturated or partially unsaturated heterocyclic ring.

It will be appreciated that when a guanidinium cation is depicted as

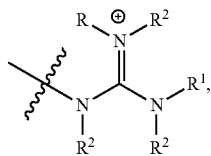

all such resonance forms are contemplated and encompassed by the present disclosure. For example, such groups can also be depicted as

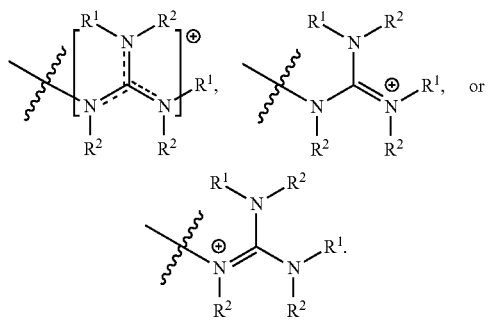

In specific embodiments, a guanidinium cation is selected from the group consisting of:

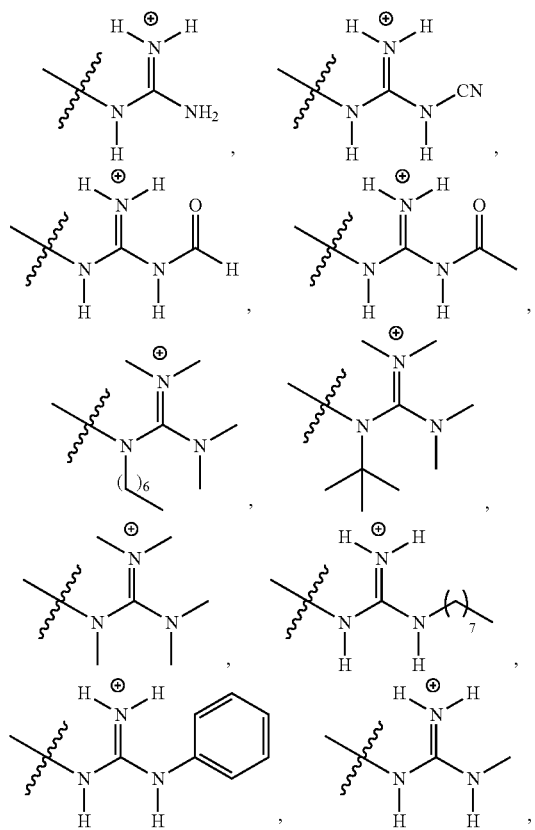

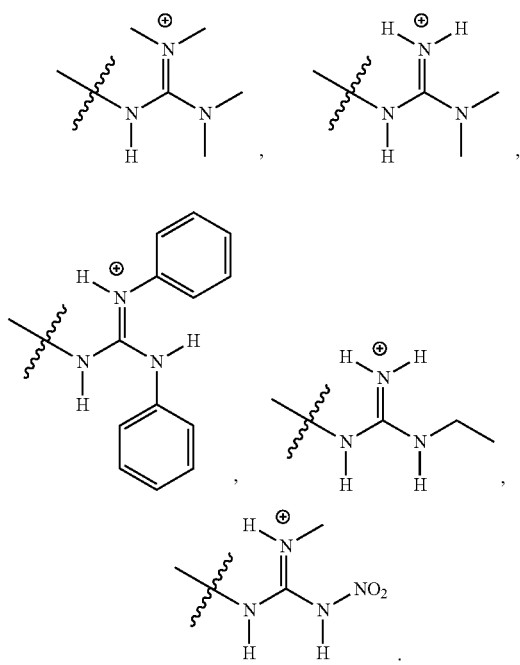

In certain embodiments, a polymerization catalyst comprises a carboxylate salt of a sulfonium group or an arsonium group, such as

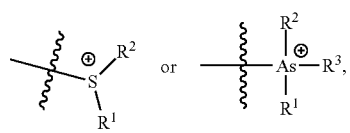

wherein each of $R^1$, $R^2$, and $R^3$ are as defined above and described in classes and subclasses herein.

In specific embodiments, an arsonium cation is selected from the group consisting of:

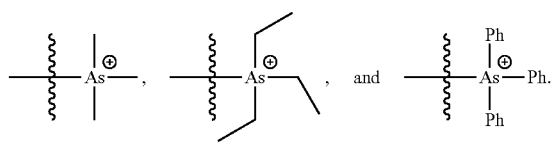

In certain embodiments, a polymerization catalyst comprises a carboxylate salt of an optionally substituted nitrogen-containing heterocycle. In certain embodiments, the nitrogen-containing heterocycle is an aromatic heterocycle. In certain embodiments, the optionally substituted nitrogen-containing heterocycle is selected from the group consisting of: pyridine, imidazole, pyrrolidine, pyrazole, quinoline, thiazole, dithiazole, oxazole, triazole, pyrazolem, isoxazole, isothiazole, tetrazole, pyrazine, thiazine, and triazine.

In certain embodiments, a nitrogen-containing heterocycle includes a quaternarized nitrogen atom. In certain embodiments, a nitrogen-containing heterocycle includes an iminium moiety such as

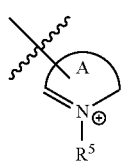

In certain embodiments, the optionally substituted nitrogen-containing heterocycle is selected from the group consisting of pyridinium, imidazolium, pyrrolidinium, pyrazolium, quinolinium, thiazolium, dithiazolium, oxazolium, triazolium, isoxazolium, isothiazolium, tetrazolium, pyrazinium, thiazinium, and triazinium.

In certain embodiments, a nitrogen-containing heterocycle is linked to a metal complex via a ring nitrogen atom. In certain embodiments, a ring nitrogen to which the attachment is made is thereby quaternized, and In certain embodiments, linkage to a metal complex takes the place of an N—H bond and the nitrogen atom thereby remains neutral. In certain embodiments, an optionally substituted N-linked nitrogen-containing heterocycle is a pyridinium derivative. In certain embodiments, optionally substituted N-linked nitrogen-containing heterocycle is an imidazolium derivative. In certain embodiments, optionally substituted N-linked nitrogen-containing heterocycle is a thiazolium derivative. In certain embodiments, optionally substituted N-linked nitrogen-containing heterocycle is a pyridinium derivative.

In certain embodiments, a polymerization catalyst comprises a carboxylate salt of

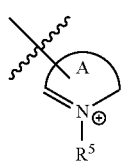

In certain embodiments, ring A is an optionally substituted, 5- to 10-membered heteroaryl group. In certain embodiments. Ring A is an optionally substituted, 6-membered heteroaryl group. In certain embodiments, Ring A is a ring of a fused heterocycle. In certain embodiments, Ring A is an optionally substituted pyridyl group.

In specific embodiments, a nitrogen-containing heterocyclic cation is selected from the group consisting of:

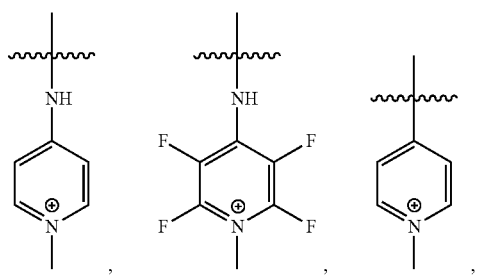

-continued

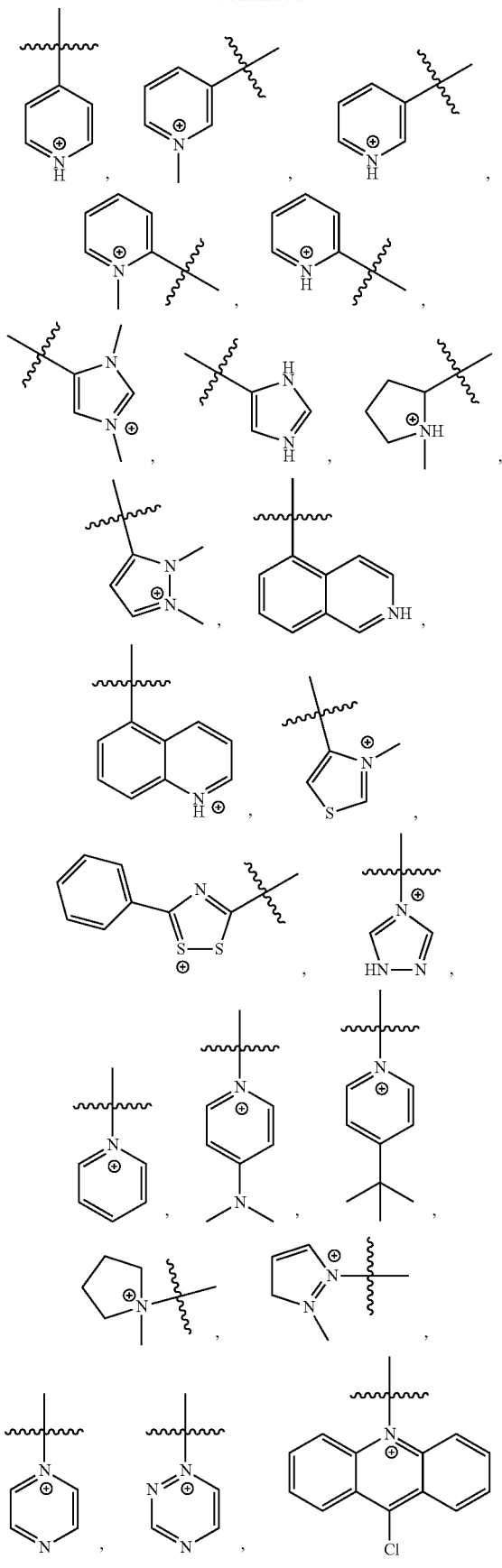

In certain embodiments, a polymerization catalyst comprises a carboxylate salt of $$\begin{array}{cc} R^1\diagdown_{\stackrel{\displaystyle N}{\oplus}}\diagup R^2 & R^1\diagdown_{\stackrel{\displaystyle N}{\oplus}}\diagup R^2 \\ \phantom{-}\diagdown_{\stackrel{\displaystyle N}{\phantom{N}}}\diagup R^3 & \phantom{-}\diagdown_{\stackrel{\displaystyle N}{\phantom{N}}}\diagup R^3 \quad X^{\ominus} \\ \phantom{R^1}\mid & \phantom{R^1}\mid \\ R^2 & R^2 \end{array}$$

or where each $R^1$, $R^2$, and $R^3$ is independently as defined above and described in classes and subclasses herein.

In certain embodiments, a polymerization catalyst comprises a carboxylate salt of $$\begin{array}{c} R^1\diagdown_{\stackrel{\displaystyle N}{\oplus}}\diagup R^2 \\ \phantom{-}\diagdown_{\stackrel{\displaystyle N}{\phantom{N}}}\diagup R^2, \\ \phantom{R^1}\mid \\ R^1 \end{array}$$

wherein each $R^1$ and $R^2$ is independently as defined above and described in classes and subclasses herein.

In certain embodiments, a polymerization catalyst comprises a carboxylate salt of

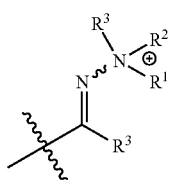

wherein each $R^1$, $R^2$, and $R^3$ is independently as defined above and described in classes and subclasses herein.

In certain embodiments, a polymerization catalyst comprises a carboxylate salt of

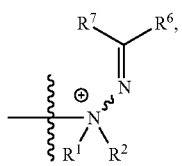

wherein each of $R^1$, $R^2$, $R^6$, and $R^7$ is as defined above and described in classes and subclasses herein.

In certain embodiments, $R^6$ and $R^7$ are each independently an optionally substituted group selected from the group consisting of $C_{1-20}$ aliphatic; $C_{1-20}$ heteroaliphatic; phenyl, and 8-10-membered aryl. In certain embodiments, $R^6$ and $R^7$ are each independently an optionally substituted $C_{1-20}$ aliphatic. In certain embodiments, $R^6$ and $R^7$ are each independently an optionally substituted $C_{1-20}$ heteroaliphatic having. In certain embodiments, $R^6$ and $R^7$ are each independently an optionally substituted phenyl or 8-10-membered aryl. In certain embodiments, $R^6$ and $R^7$ are each independently an optionally substituted 5- to 10-membered heteroaryl. In certain embodiments, $R^6$ and $R^7$ can be taken together with intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted 5- to 10-membered heteroaryl. In certain embodiments, $R^6$ and $R^7$ are each independently an optionally substituted $C_{1-6}$ aliphatic. In certain embodiments, each occurrence of $R^6$ and $R^7$ is independently methyl, ethyl, propyl, butyl, pentyl, hexyl, heptyl, octyl, or benzyl. In certain embodiments, each occurrence of $R^6$ and $R^7$ is independently perfluoro. In certain embodiments, each occurrence of $R^6$ and $R^7$ is independently —$CF_2CF_3$.

In certain embodiments, a polymerization catalyst comprises a carboxylate salt of

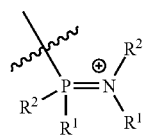

wherein each $R^1$ and $R^2$ is independently as defined above and described in classes and subclasses herein.

In certain embodiments, a polymerization catalyst comprises a carboxylate salt of

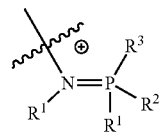

wherein each $R^1$, $R^2$, and $R^3$ is independently as defined above and described in classes and subclasses herein.

In certain embodiments, a cation is

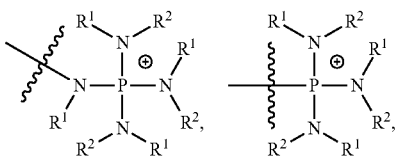

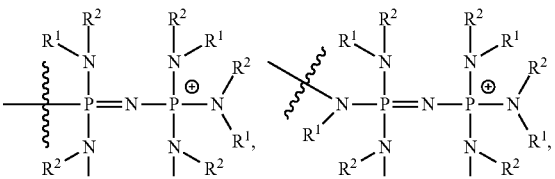

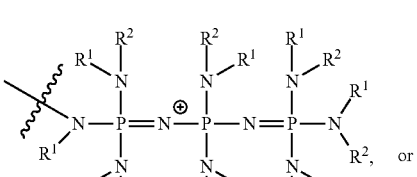

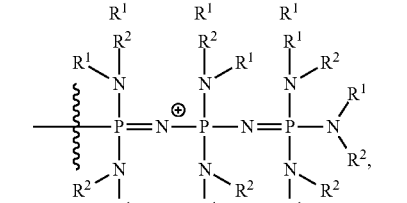

wherein each $R^1$ and $R^2$ is independently as defined above and described in classes and subclasses herein.

In certain embodiments, a polymerization catalyst comprises a carboxylate salt of

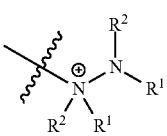

wherein each $R^1$ and $R^2$ is independently as defined above and described in classes and subclasses herein.

In certain embodiments, a polymerization catalyst comprises a carboxylate salt of

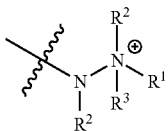

wherein each $R^1$, $R^2$, and $R^3$ is independently as defined above and described in classes and subclasses herein.

In certain embodiments, a polymerization catalyst comprises a carboxylate salt of

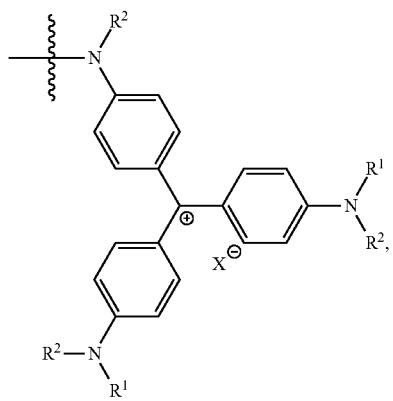

wherein each $R^1$ and $R^2$ is independently as defined above and described in classes and subclasses herein. In certain embodiments, suitable catalysts include transition metal compounds. In certain embodiments, suitable catalysts include acid catalysts. In certain embodiments, the catalyst is a heterogeneous catalyst.

In certain embodiments, the carboxylate salt of the polymerization catalyst is a compound of Formula (II):

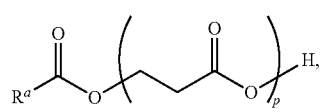

(II)

where p is from 0 to 9 and $R^a$ is a non-volatile moiety. The term "non-volatile moiety," as used herein, refers to a moiety or material to which a carboxylate can be attached, and that renders the carboxylate (e.g., when p=0) non-volatile to pyrolysis conditions. In some embodiments, a non-volatile moiety is selected from the group consisting of glass surfaces, silica surfaces, plastic surfaces, metal surfaces including zeolites, surfaces containing a metallic or chemical coating, membranes (e.g., nylon, polysulfone, silica), microbeads (e.g., latex, polystyrene, or other polymer), and porous polymer matrices (e.g., polyacrylamide, polysaccharide, polymethacrylate). In some embodiments, a non-volatile moiety has a molecular weight above 100, 200, 500, or 1000 g/mol. In some embodiments, a non-volatile moiety is part of a fixed or packed bed system. In some embodiments, a non-volatile moiety is part of a fixed or packed bed system comprising pellets (e.g., zeolite).

In certain embodiments, p is from 0 to 5. In certain embodiments, the carboxylate salt of the polymerization catalyst is an acrylate salt (i.e., of compound of Formula (II) where p=0).

In some embodiments, a suitable carboxylate catalyst is heterogeneous. In some embodiments, a suitable carboxylate catalyst will remain in a reaction zone as a salt or melt after removal of all other products, intermediates, starting materials, byproducts, and other reaction components. In some embodiments, a suitable carboxylate catalyst of Formula (II) will remain in a reaction zone as a salt or melt after removal of all acrylic acid product stream.

In certain embodiments, a polymerization catalyst is recycled for further use in a reaction zone. In some embodiments, a salt or melt catalyst is recycled to a reaction zone. In some embodiments, provided methods further comprise withdrawing a recycling stream of homogeneous catalyst to a reaction zone. In some embodiments, such a recycling stream comprises a high boiling solvent, wherein the solvent's boiling point is above the pyrolysis temperature of PPL and the catalyst remains in the high boiling solvent during pyrolysis while the withdrawn acrylic acid product stream is gaseous. As used herein, the term "high boiling solvent" refers to a solvent having a boiling point higher than that of the pyrolysis temperature of PPL. In some embodiments, a high boiling point solvent has a boiling point higher than 150° C. Boiling points used herein are the boiling points at a pressure of 1 atm.

In some variations of the foregoing, the catalyst recycling stream has less than 0.01 wt % of oxygen. In certain variations, the catalyst recycling stream has less than 0.005 wt % oxygen. In certain variations, the catalyst recycling stream has less than 200 ppm oxygen. In certain variations, the catalyst recycling stream has less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen. In certain variations, the catalyst recycling stream has less than 0.05 wt % water. In certain variations, the catalyst recycling stream has less than 0.01 wt % water. In certain variations, the catalyst recycling stream has less than 1000 ppm water. In certain variations, the catalyst recycling stream has less than 500 ppm water, less than 400 ppm water, less than 250 ppm water, less than 200 ppm water, less than 150 ppm water, less than 100 ppm water, less than 50 ppm water, or less than 10 ppm water. In certain variations, the catalyst recycling stream has less than 200 ppm of oxygen and water combined.

Nanofiltration

As discussed above, in certain embodiments, the methods include separating carbonylation catalyst from the beta lactone product stream. Methods of separating carbonylation catalyst from the beta lactone product stream are known in the art and include those described in WO2014/008232. In some embodiments, separation of the carbonylation catalyst is performed by nanofiltration on a nanofiltration membrane. This may produce two process streams: a permeate stream comprising beta lactone product in a portion of an organic solvent passing through the nanofiltration membrane and a retentate stream containing the carbonylation catalyst retained by the nanofiltration membrane and the remainder of the organic solvent. In some embodiments, this retained mixture of organic solvent and carbonylation catalyst is treated as a catalyst recycling stream. In these embodiments, the catalyst recycling stream may be returned to the first step of the process where it is recharged or contacted with additional epoxide and passed through the sequence again.

In some embodiments, the permeate stream is distilled to separate the lactone product from the organic solvent. In some embodiments, the permeate stream is fed to a distillation unit prior to treating the beta lactone under conditions that cause polymerization to PPL.

In some embodiments, the separation of beta lactone from catalyst is performed by exposing the lactone-containing process stream to a nanofiltration membrane. The nanofiltration membrane is preferably an organic solvent-stable nanofiltration membrane. Although any nanofiltration membrane may be used in combination with any organic solvent or organic solvent system compatible with the carbonylation reaction and the nanofiltration membrane within the spirit herein, the nanofiltration membrane is preferably selected in combination with the organic solvent or solvents such that the process achieves predetermined levels of lactone formation and catalyst separation.

The other stream resulting from the nanofiltration step is the retentate stream or catalyst recycling stream. In certain embodiments, this stream is returned to the beginning of the process where it re-enters the carbonylation step and is brought into contact with additional epoxide and carbon monoxide. In some embodiments, provided methods further comprise returning a carbonylation catalyst recycling stream to the first reaction zone. In certain embodiments, the catalyst recycling stream is treated prior to re-entering the carbonylation process. Such treatments can include, for example, filtering, concentrating, diluting, heating, cooling, or degassing the stream; removing spent catalyst; removing reaction byproducts; adding fresh catalyst; adding one or more catalyst components; and any combination of two or more of these.

Acrylate Recycling

The polymerization mode of PPL from BPL proceeds in a manner contrary to the typical polyester polymerization. While polyesters are generally formed by the attack of a hydroxyl group at the carbonyl of a carboxylic group, the strain of the BPL ring affords a unique reactivity wherein a carboxylate anion attacks at the beta carbon, resulting in a terminal carboxylate which may then react with another unit of BPL to propagate the polymer chain:

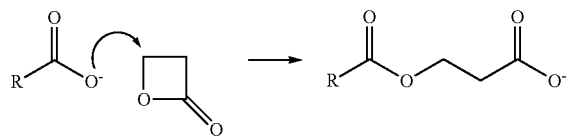

In some embodiments of provided methods, the polymerization of BPL to PPL is catalyzed by an acrylate. Resulting polymer chains will then comprise acrylate end groups. In some embodiments, where PPL undergoes pyrolysis to acrylic acid, a carboxylate required to initiate polymerization is acrylic acid provided via a return loop from a product stream. In some embodiments, a portion of acrylic acid produced by a provided method is returned to a reaction zone to initiate polymerization. In some embodiments, acrylic acid formed in situ in a provided method is sufficient to initiate and maintain the conversion of BPL to PPL.

Heat Capturing

In some embodiments of the provided methods, heat generated from one portion of a process is captured. For example, polymerization of BPL to PPL is an exothermic process and excess heat generated from the reaction may be captured. In certain embodiments, captured heat is low grade heat. In some embodiments, heat generated from a second reaction zone is used to maintain the temperature of the second reaction zone. In some embodiments of provided methods, heat generated from a second reaction zone is captured and directed to other processes. In certain embodiments, heat is directed to a third reaction zone. In some embodiments, the heat is directed to distillation of a carbonylation solvent. In certain embodiments, heat is directed to a first reaction zone containing a carbonylation process used to provide BPL. In some embodiments, heat is directed to keep a downstream product stream (e.g., acrylic acid) at an appropriate temperature.

Reaction Mode

The methods herein place no particular limits on the type, size or geometry of the reactor employed and indeed, in some cases, more than one reactor may be employed. It is to be understood that the term "reactor" as recited in the methods herein may actually represent more than one physical reactor (for example the reactor could be a train of continuous stirred tank reactors (CSTRs) connected in parallel or in series, or a plurality of plug flow reactors). In some embodiments, the "reactor" referred to in the methods herein may also comprise more than one type of reactor (for example the reactor could comprise a series of extruder reactors). Many such combinations are known in the art and could be employed by the skilled artisan to achieve an efficient reaction in the methods described herein.

Polymerization Solvents

In some embodiments, the polymerization of BPL to PPL proceeds in the absence of solvent. In other embodiments, contacting a beta lactone with a polymerization catalyst is performed in the presence of one or more solvents. Suitable solvents can include, for example, hydrocarbons, ethers, esters, ketones, nitriles, amides, sulfones, halogenated hydrocarbons, and the like. In certain embodiments, the solvent is selected such that the polymer formed is soluble in the reaction medium.

With certain combinations of carbonylation and polymerization catalysts, solvent orthogonality has been observed wherein the optimal solvent in one reaction is incompatible with the other reaction. For example, in some variations, the carbonylation reaction may take place in the solvent, whereas the polymerization does not take place in such solvent. Therefore, in certain embodiments the provided methods afford the opportunity to select the best solvent for each reaction by allowing the removal of carbonylation solvent from the reaction stream and optionally the addition of another solvent for the polymerization reaction. In some embodiments, a carbonylation solvent and polymerization solvent are different.

Without wishing to be bound by any particular theory, it is believed that solvents comprising Lewis bases of low to moderate polarity may improve the performance of the polymerization reaction. Thus, in certain embodiments, a polymerization solvent comprises a Lewis base and is less polar than 1,3-dioxane ($\varepsilon$=dielectric constant at 20° C.=13.6). In certain embodiments, a polymerization solvent comprises a Lewis base and is less polar than ortho-difluorobenzene ($\varepsilon$=13). In certain embodiments, a polymerization solvent comprises a Lewis base and is less polar than metadifluorobenzene ($\varepsilon$=5). In certain embodiments, a polymerization solvent comprises a Lewis base with substantially the same polarity as 1,4-dioxane ($\varepsilon$=2.2). In some embodiments, a polymerization solvent is less polar than a carbonylation solvent as measured by dielectric constant. In some embodiments, a polymerization solvent has a dielectric constant at 20° C. of less than about 13.6, less than about 13, or less than about 5.

II. Systems

In another aspect, provided are systems for the synthesis of PPL. In some embodiments, a system for the conversion of ethylene oxide to polypropiolactone comprises:
(a) ethylene oxide and carbon monoxide;
(b) a first reaction zone where ethylene oxide and carbon monoxide are contacted with a carbonylation catalyst in the presence of a carbonylation solvent, where at least a portion of the EO is converted to a beta propiolactone product stream;
(c) a solvent removal unit for removing carbonylation solvent from the beta propiolactone product stream; and
(d) optionally a second solvent different from the carbonylation solvent, introduced into the beta propiolactone product stream after solvent removal; and
(e) a second reaction zone where the beta propiolactone product stream is contacted with a suitable polymerization catalyst, where at least a portion of the beta propiolactone forms polypropiolactone.

In some variations, provided is a system for converting ethylene oxide to polypropiolactone (PPL), comprising:
an ethylene oxide source;
a carbon monoxide source;
a carbonylation catalyst source;
a carbonylation solvent source;
a polymerization catalyst source:
a first reaction zone configured to receive ethylene oxide from the ethylene oxide source, carbon monoxide from the carbon monoxide source, carbonylation catalyst from the carbonylation catalyst source, and carbonylation solvent from the carbonylation solvent source, and to output a beta propiolactone (BPL) product stream from contacting the ethylene oxide and the carbon monoxide with the carbonylation catalyst in the presence of the carbonylation solvent in the first reaction zone, wherein the BPL product stream comprises carbonylation solvent and BPL;
a solvent removal unit configured to remove at least a portion of the carbonylation solvent from the BPL product stream; and
a second reaction zone configured to receive the BPL product stream from the solvent removal unit, and polymerization catalyst from the polymerization catalyst source, and to output a PPL product stream from contacting the BPL product stream with the polymerization catalyst in the second reaction zone, wherein the PPL product stream comprises PPL.

In some variations, provided is a system for converting ethylene oxide to polypropiolactone (PPL), comprising:
an ethylene oxide source;
a carbon monoxide source:
a carbonylation catalyst source;
a carbonylation solvent source:
a polymerization catalyst source;
a first reaction zone configured to receive ethylene oxide from the ethylene oxide source, carbon monoxide from the carbon monoxide source, carbonylation catalyst from the carbonylation catalyst source, and carbonylation solvent from the carbonylation solvent source, and to output a beta propiolactone (BPL) product stream from contacting the ethylene oxide and the carbon monoxide with the carbonylation catalyst in the presence of the carbonylation solvent in the first reaction zone, wherein the BPL product stream comprises carbonylation solvent and BPL:
a solvent removal unit configured to remove at least a portion of the carbonylation solvent from the BPL product stream; and
a second reaction zone configured to receive the BPL product stream from the solvent removal unit, and polymerization catalyst from the polymerization catalyst source, and to output a PPL product stream from contacting the BPL product stream with the polymerization catalyst in the second reaction zone, wherein the PPL product stream comprises PPL.

In one variation, the system further comprises a second solvent source, wherein the second solvent source is configured to output a second solvent for combining with the BPL product stream, wherein the second solvent is different from the carbonylation solvent.

It should generally be understood that reference to "a first reaction zone" and "a second reaction zone", etc. or "a first solvent" and "a second solvent", etc., or "a first solvent source" and "a second solvent source", etc., does not necessarily imply an order of the reaction zones, solvents or solvent sources. In some variations, the use of such references denotes the number of reaction zones, solvents or solvent sources present. In other variations, an order may be implied by the context in which the reaction zones, solvents or solvent sources are configured or used.

For example, FIG. 1 depicts an exemplary system 100 for the production of polypropiolactone and glacial acrylic acid. With reference to FIG. 1, ethylene oxide (EO) from EO source 102, carbon monoxide (CO) from CO source 104, carbonylation catalyst from catalyst tank 106, and a carbonylation solvent from solvent source 108 are fed to lactone reactor 110 to produce BPL. Excess carbon monoxide 116 in the product stream exiting lactone reactor 110 may be removed via flash tank 112 and condenser 114, while the BPL product stream enters nanofiltration system 120 for removal of carbonylation catalyst. In some variations of the system, the BPL product stream may pass through pre-filter 118 prior to entry into nanofiltration unit 120. Carbonylation catalyst recycling loop 121 may feed recovered carbonylation catalyst back to lactone reactor 110. The filtered BPL product stream exiting nanofiltration unit 120 then enters distillation unit 122, wherein carbonylation solvent is removed from the BPL, and the withdrawn solvent stream may be stored in recycle storage 124 and/or returned to lactone reactor 110. PPL catalyst from PPL catalyst tank 128 is combined with neat BPL stream 126 and collectively enter extruder reactor 130, optionally along with a second solvent (not depicted in FIG. 1). PPL synthesis occurs in extruder reactor 130 and is withdrawn and directed to pyrolysis reactor 132. Pyrolysis reactor 132 may be maintained at a temperature at or above the pyrolysis temperature of PPL, and GAA product stream 134 is withdrawn. In some variations, system 100 may further include condenser 136 to condense the high boiling impurities, and such impurities can then be purged from the reactor as a residual waste stream. Waste 138 may be purged from pyrolysis reactor 132.

It should generally be understood that one or more units may be omitted or added to exemplary system 100 depicted in FIG. 1. For example, in some variations, catalyst tank 106 may be omitted in favor of using a heterogeneous carbonylation catalyst in a fixed bed arrangement in lactone reactor 110. In other variations, pre-filter 118 may be omitted, and the BPL product stream may pass through directly into nanofiltration unit 120. In other variations, carbonylation catalyst recycling loop 112 may be further purified into an additional purification (including, for example, an additional distillation unit) prior to return to lactone reactor 110.

It should generally be understood that any of the variations and embodiments described herein for the methods may also apply to the systems described herein.

Enumerated Embodiments

The following enumerated embodiments are representative of some aspects of the invention.

1. A method for the synthesis of polypropiolactone comprising:
   (a) providing feedstock streams of ethylene oxide (EO) and carbon monoxide, which feedstock streams are optionally combined;
   (b) directing the feedstock streams to a first reaction zone where they are contacted with a carbonylation catalyst in the presence of a carbonylation solvent and where at least a portion of the EO is converted to a beta propiolactone (BPL) product stream comprising BPL;
   (c) separating carbonylation catalyst from the beta lactone product stream to provide a carbonylation catalyst recycling stream;
   (d) directing the beta propiolactone product stream comprising BPL and carbonylation solvent to a carbonylation solvent removal zone where carbonylation solvent is removed from the beta propiolactone product stream;
   (e) optionally introducing a second solvent into the beta propiolactone product stream after step (d) and directing the beta propiolactone product stream to a second reaction zone where BPL is contacted with a polymerization catalyst to form polypropiolactone.

2. The method of embodiment 1, wherein step (d) comprises distilling the carbonylation solvent and withdrawing a distillation stream of the carbonylation solvent.

3. The method of embodiment 1 or 2, wherein the carbonylation solvent has a boiling point below 160° C. at 1 atm.

4. The method of any one of the preceding embodiments, wherein the second reaction zone is a reactive extruder.

5. The method of any one of the preceding embodiments, wherein step (c) comprises nanofiltration on a nanofiltration membrane.

6. The method of any one of the preceding embodiments, further comprising the step of returning the carbonylation catalyst recycling stream returned to the first reaction zone.

7. The method of any one of the preceding embodiments, wherein the heat generated in step (e) is used to maintain the temperature of the second reaction zone.

8. The method of embodiment 4, further comprising the steps of capturing heat generated from step (e) and directing the heat to other processes.

9. The method of embodiment 8, wherein the heat is directed to the distillation of the carbonylation solvent.

10. The method of any one of the preceding embodiments, wherein the beta propiolactone product stream in step (e) is neat when introduced into the second reaction zone.

11. The method of any one of the preceding embodiments, wherein the polymerization catalyst of step (e) is a salt of a compound of formula:

$$\text{structure with acrylate group } O=CH-CH=... -O-(CH_2CH_2C(O)O)_p-H$$

wherein p is 0 to 9.

12. The method of any one of embodiments 1-10, wherein the polymerization catalyst of step (e) is a salt of a compound of formula:

$$R^a-C(O)-O-(CH_2CH_2C(O)O)_p-H,$$

where p is from 0 to 9 and $R^a$ is a non-volatile moiety.

13. The method of any one of the preceding embodiments, wherein the carbonylation catalyst comprises a metal carbonyl.

14. The method of any one of the preceding embodiments, wherein the carbonylation solvent comprises a polar donating solvent.

15. The method of any one of the preceding embodiments, wherein step (e) is conducted in the absence of solvent.

16. The method of any one of embodiments 1-14, wherein the second solvent of step (e) is different from the carbonylation solvent.

17. The method of any one of embodiments 1-14 or 16, wherein the second solvent of step (e) is less polar than the carbonylation solvent as measured by dielectric constant.

18. A system for the conversion of ethylene oxide to polypropiolactone comprising:
   (a) ethylene oxide and carbon monoxide;
   (b) a first reaction zone where ethylene oxide and carbon monoxide are contacted with a carbonylation catalyst in the presence of a carbonylation solvent, where at least a portion of the EO is converted to a beta propiolactone product stream;
   (c) a solvent removal unit for removing carbonylation solvent from the beta propiolactone product stream; and
   (d) optionally a second solvent different from the carbonylation solvent, introduced into the beta propiolactone product stream after solvent removal; and
   (e) a second reaction zone where the beta propiolactone product stream is contacted with a suitable polymerization catalyst, where at least a portion of the beta propiolactone forms polypropiolactone.

19. The system of embodiment 18, wherein the carbonylation solvent has a boiling point below 160° C. at 1 atm.

20. The system of embodiment 18 or 19, wherein the second reaction zone is a reactive extruder.

21. The system of any one of embodiments 18 to 20, wherein the solvent removal unit comprises a nanofiltration membrane.

22. The system of any one of embodiments 18 to 21, wherein a heat exchanger is connected to the second reaction zone.

23. The system of any one of embodiments 18 to 22, wherein the polymerization catalyst is a salt of a compound of formula:

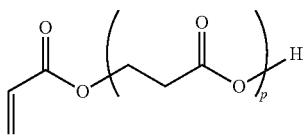

wherein p is 0 to 9.

24. The system of any one of embodiments 18 to 22, wherein the polymerization catalyst is a salt of a compound of formula:

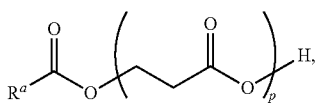

where p is from 0 to 9 and $R^a$ is a non-volatile moiety.

25. The system of any one of embodiments 18 to 24, wherein the carbonylation catalyst comprises a metal carbonyl.

26. The system of any one of embodiments 18 to 25, wherein the carbonylation solvent comprises a polar donating solvent.

27. The system of any one of embodiments 18 to 26, wherein the second solvent is different from the carbonylation solvent.

28. The system of any one of embodiments 18 to 27, wherein the second solvent is less polar than the carbonylation solvent as measured by dielectric constant.

29. A method for producing polypropiolactone (PPL), comprising:
providing feedstock streams of ethylene oxide (EO) and carbon monoxide, wherein the feedstock streams are optionally combined;
directing the feedstock streams to a first reaction zone;
contacting the feedstock streams with a carbonylation catalyst in the presence of a carbonylation solvent in the first reaction zone to convert at least a portion of the EO to a beta propiolactone (BPL) product stream, wherein the BPL product stream comprises BPL, carbonylation catalyst, and carbonylation solvent;
separating at least a portion of carbonylation catalyst from the BPL product stream to produce a carbonylation catalyst recycling stream and a processed BPL product stream, wherein the processed BPL product stream comprises BPL and carbonylation solvent;
directing the processed BPL product stream to a carbonylation solvent removal zone:
removing at least a portion of the carbonylation solvent from the processed BPL product stream to produce a polymerization feed stream, wherein the polymerization feed stream comprises BPL;
directing the polymerization feed stream to a second reaction zone; and
contacting BPL in the polymerization feed stream with a polymerization catalyst in the second reaction zone to produce PPL.

30. The method of embodiment 29, further comprising introducing a second solvent into the polymerization feed stream, prior to contacting the polymerization feed stream with the polymerization catalyst.

31. The method of embodiment 29 or 30, wherein the removing of at least a portion of the carbonylation solvent from the processed BPL product stream comprises distilling at least a portion of the carbonylation solvent and withdrawing a distillation stream of the carbonylation solvent.

32. The method of any one of embodiments 29 to 31, wherein the carbonylation solvent has a boiling point below 160° C. at 1 atm.

33. The method of embodiment 32, wherein the carbonylation solvent has a boiling point, at 1 atm, below 150° C., below 140° C., below 130° C., below 120° C., below 110° C., below 100° C., below 90° C. or below 80° C.; or between 60° C. and 160° C., between 60° C. and 150° C., between 60° C. and 140° C., between 60° C. and 130° C., between 60° C. and 120° C., between 60° C. and 110° C., between 60° C. and 110° C., between 60° C. and 100° C., between 60° C. and 90° C., between 60° C. and 80° C., between 70° C. and 160° C., between 70° C. and 150° C., between 70° C. and 140° C., between 70° C. and 130° C., between 70° C. and 120° C., between 70° C. and 110° C., between 70° C. and 110° C., between 70° C. and 100° C., between 70° C. and 90° C., or between 70° C. and 80° C.

34. The method of any one of embodiments 29 to 33, wherein the second reaction zone is a reactive extruder.

35. The method of any one of embodiments 29 to 34, wherein the separating of at least a portion of carbonylation catalyst from the BPL product stream comprises nanofiltration on a nanofiltration membrane.

36. The method of any one of embodiments 29 to 35, further comprising returning the carbonylation catalyst recycling stream returned to the first reaction zone.

37. The method of any one of embodiments 29 to 36, wherein heat is generated from contacting of the BPL in the polymerization feed stream with the polymerization catalyst.

38. The method of embodiment 37, wherein at least a portion of the heat generated is used to maintain the temperature of the second reaction zone.

39. The method of embodiment 37, further comprising capturing at least a portion of the heat generated, and directing the captured heat to other processes.

40. The method of embodiment 39, wherein the captured heat is directed to the distillation of the carbonylation solvent.

41. The method of any one of embodiments 29 to 40, wherein the polymerization feed stream is neat when introduced into the second reaction zone.

42. The method of any one of embodiments 29 to 41, wherein the polymerization catalyst is a salt of a compound of formula:

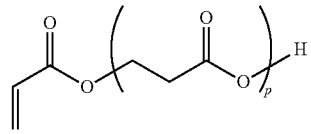

wherein p is 0 to 9.

43. The method of any one of embodiments 29 to 41, wherein the polymerization catalyst is a salt of a compound of formula:

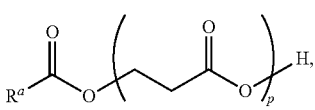

where p is from 0 to 9 and $R^a$ is a non-volatile moiety.

44. The method of any one of embodiments 29 to 43, wherein the carbonylation catalyst comprises a metal carbonyl.

45. The method of any one of embodiments 29 to 44, wherein the carbonylation solvent comprises a polar donating solvent.

46. The method of any one of embodiments 29 to 45, wherein the contacting of the BPL in the polymerization feed stream with the polymerization catalyst is conducted in the absence of solvent.

47. The method of any one of embodiments 30 to 46, wherein the second solvent is different from the carbonylation solvent.

48. The method of any one of embodiments 30 to 45 or 47, wherein the second solvent is less polar than the carbonylation solvent as measured by dielectric constant.

49. The method of any one of embodiments 29 to 48, wherein the feedstock stream each independently has less than 0.005 wt % oxygen.

50. The method of any one of embodiments 29 to 48, wherein the feedstock stream each independently has less than 200 ppm oxygen, less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen.

51. The method of any one of embodiments 29 to 50, wherein the feedstock stream each independently has less than 0.05 wt % water, or less than 0.01 wt % water.

52. The method of any one of embodiments 29 to 50, wherein the feedstock stream each independently has less than 1000 ppm water, less than 500 ppm water, less than 400 ppm water, less than 250 ppm water, less than 200 ppm water, less than 150 ppm water, less than 100 ppm water, less than 50 ppm water, or less than 10 ppm water.

53. The method of any one of embodiments 29 to 50, wherein the feedstock stream each independently has less than 200 ppm of oxygen and water combined.

54. The method of any one of embodiments 29 to 53, wherein the carbonylation catalyst recycling stream has less than 0.005 wt % oxygen.

55. The method of any one of embodiments 29 to 53, wherein the carbonylation catalyst recycling stream has less than 200 ppm oxygen, less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen.

56. The method of any one of embodiments 29 to 55, wherein the carbonylation catalyst recycling stream has less than 0.05 wt % water, or less than 0.01 wt % water.

57. The method of any one of embodiments 29 to 55, wherein the carbonylation catalyst recycling stream has less than 1000 ppm water, less than 500 ppm water, less than 400 ppm water, less than 250 ppm water, less than 200 ppm water, less than 150 ppm water, less than 100 ppm water, less than 50 ppm water, or less than 10 ppm water.

58. The method of any one of embodiments 29 to 57, wherein the carbonylation catalyst recycling stream has less than 200 ppm of oxygen and water combined.

59. A system for converting ethylene oxide to polypropiolactone (PPL), comprising: an ethylene oxide source;
a carbon monoxide source;
a carbonylation catalyst source;
a carbonylation solvent source;
a polymerization catalyst source;
a first reaction zone configured to receive ethylene oxide from the ethylene oxide source, carbon monoxide from the carbon monoxide source, carbonylation catalyst from the carbonylation catalyst source, and carbonylation solvent from the carbonylation solvent source, and to output a beta propiolactone (BPL) product stream from contacting the ethylene oxide and the carbon monoxide with the carbonylation catalyst in the presence of the carbonylation solvent in the first reaction zone, wherein the BPL product stream comprises carbonylation solvent and BPL:
a solvent removal unit configured to receive the BPL product stream and to remove at least a portion of the carbonylation solvent from the BPL product stream; and
a second reaction zone configured to receive the BPL product stream from the solvent removal unit, and polymerization catalyst from the polymerization catalyst source, and to output a PPL product stream from contacting the BPL product stream with the polymerization catalyst in the second reaction zone, wherein the PPL product stream comprises PPL.

60. The system of embodiment 59, further comprising a second solvent source, wherein the second solvent source is configured to output a second solvent for combining with the BPL product stream, wherein the second solvent is different from the carbonylation solvent.

61. The system of embodiment 59 or 60, wherein the carbonylation solvent has a boiling point below 160° C. at 1 atm.

62. The system of embodiment 61, wherein the carbonylation solvent has a boiling point, at 1 atm, below 150° C., below 140° C., below 130° C., below 120° C., below 110° C., below 100° C., below 90° C., or below 80° C.; or between 60° C. and 160° C., between 60° C. and 150° C., between 60° C. and 140° C., between 60° C. and 130° C., between 60° C. and 120° C., between 60° C. and 110° C., between 60° C. and 110° C., between 60° C. and 100° C., between 60° C. and 90° C., between 60° C. and 80° C., between 70° C. and 160° C., between 70° C. and 150° C., between 70° C. and 140° C., between 70° C. and 130° C., between 70° C. and 120° C., between 70° C. and 110° C., between 70° C. and 110° C., between 70° C. and 100° C. between 70° C. and 90° C., or between 70° C. and 80° C.

63. The system of any one of embodiments 59 to 62, wherein the second reaction zone is a reactive extruder.

64. The system of any one of embodiments 59 to 63, further comprising a nanofiltration membrane configured to receive the BPL product stream, to remove at least a portion of the carbonylation catalyst from the BPL product stream, and to output a catalyst recycling stream and a polymerization feed stream,
wherein the polymerization feed stream comprises BPL, and wherein the second reaction zone is configured to receive the polymerization feed stream.

65. The system of embodiment 64, further comprising a carbonylation catalyst recycling loop configured to return the catalyst recycling stream output from the nanofiltration membrane to the first reaction zone.

66. The system of any one of embodiments 59 to 65, further comprising a heat exchanger configured to capture at least a portion of heat generated in the second reaction zone.

67. The system of any one of embodiments 59 to 66, wherein the polymerization catalyst is a salt of a compound of formula:

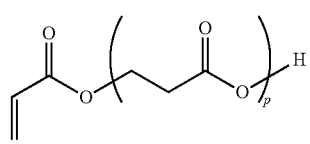

wherein p is 0 to 9.

68. The system of any one of embodiments 59 to 66, wherein the polymerization catalyst is a salt of a compound of formula:

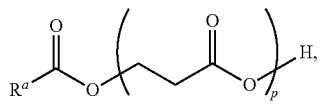

where p is from 0 to 9 and $R^a$ is a non-volatile moiety.

69. The system of any one of embodiments 59 to 68, wherein the carbonylation catalyst comprises a metal carbonyl.

70. The system of any one of embodiments 59 to 69, wherein the carbonylation solvent comprises a polar donating solvent.

71. The system of any one of embodiments 60 to 70, wherein the second solvent is different from the carbonylation solvent.

72. The system of any one of embodiments 60 to 71, wherein the second solvent is less polar than the carbonylation solvent as measured by dielectric constant.

73. The system of any one of embodiments 59 to 72, wherein the ethylene oxide and the carbon monoxide each independently has less than 0.005 wt % oxygen.

74. The system of any one of embodiments 59 to 72, wherein the ethylene oxide and the carbon monoxide each independently has less than 200 ppm oxygen, less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen.

75. The system of any one of embodiments 59 to 74, wherein the ethylene oxide and the carbon monoxide each independently has less than 0.05 wt % water, or less than 0.01 wt % water.

76. The system of any one of embodiments 59 to 74, wherein the ethylene oxide and the carbon monoxide each independently has less than 1000 ppm water, less than 500 ppm water, less than 400 ppm water, less than 250 ppm water, less than 200 ppm water, less than 150 ppm water, less than 100 ppm water, less than 50 ppm water, or less than 10 ppm water.

77. The system of any one of embodiments 59 to 76, wherein the ethylene oxide and the carbon monoxide each independently has less than 200 ppm of oxygen and water combined.

78. The system of any one of embodiments 64 to 77, wherein the carbonylation catalyst recycling stream has less than 0.005 wt % oxygen.

79. The system of any one of embodiments 64 to 77, wherein the carbonylation catalyst recycling stream has less than 200 ppm oxygen, less than 150 ppm oxygen, less than 100 ppm oxygen, less than 50 ppm oxygen, less than 20 ppm oxygen, less than 10 ppm oxygen, less than 5 ppm oxygen, less than 2 ppm oxygen, or less than 1 ppm oxygen.

80. The system of any one of embodiments 64 to 79, wherein the carbonylation catalyst recycling stream has less than 0.05 wt % water, or less than 0.01 wt % water.

81. The system of any one of embodiments 64 to 79, wherein the carbonylation catalyst recycling stream has less than 1000 ppm water, less than 500 ppm water, less than 400 ppm water, less than 250 ppm water, less than 200 ppm water, less than 150 ppm water, less than 100 ppm water, less than 50 ppm water, or less than 10 ppm water.

82. The system of any one of embodiments 64 to 81, wherein the carbonylation catalyst recycling stream has less than 200 ppm of oxygen and water combined.

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A continuous method for producing polypropiolactone (PPL), comprising:
providing feedstock streams of ethylene oxide (EO) and carbon monoxide, wherein the feedstock streams are optionally combined;
directing the feedstock streams to a first reaction zone;
contacting the feedstock streams with a carbonylation catalyst in the presence of a carbonylation solvent in the first reaction zone to convert at least a portion of the EO to a beta propiolactone (BPL) product stream, wherein the BPL product stream comprises BPL, carbonylation catalyst, and carbonylation solvent;
separating at least a portion of carbonylation catalyst from the BPL product stream to produce a carbonylation catalyst recycling stream and a processed BPL product stream, wherein the processed BPL product stream comprises BPL and carbonylation solvent;
directing the processed BPL product stream to a carbonylation solvent removal zone;
removing at least a portion of the carbonylation solvent from the processed BPL product stream to produce a polymerization feed stream, wherein the polymerization feed stream comprises BPL;
directing the polymerization feed stream to a second reaction zone; and
contacting BPL in the polymerization feed stream with the polymerization catalyst in the presence of a polymerization solvent that is different than the carbonylation solvent in the second reaction zone to produce PPL.

2. The method of claim 1, wherein the polymerization catalyst along with the polymerization solvent is introduced to the polymerization feed stream.

3. The method of claim 2, wherein the polymerization catalyst and polymerization catalyst are comprised of recycled polymerization catalyst and recycled polymerization solvent.

4. The method of claim 1, wherein the carbonylation solvent has a boiling point below 160° C. at 1 atm.

5. The method of claim 1, wherein the second reaction zone is a reactive extruder.

6. The method of of claim 1, wherein the separating of at least a portion of carbonylation catalyst from the BPL product stream comprises nanofiltration on a nanofiltration membrane.

7. The method of claim 1, further comprising returning the carbonylation catalyst recycling stream returned to the first reaction zone.

8. The method of claim 1, wherein heat is generated from contacting of the BPL in the polymerization feed stream with the polymerization catalyst, wherein at least a portion of the heat is used to maintain the temperature of the second reaction zone.

9. The method of claim 1, wherein heat is generated from contacting of the BPL in the polymerization feed stream with the polymerization catalyst, and the method further comprises capturing at least a portion of the heat, and directing the captured heat to other processes.

10. The method of claim 9, wherein the heat is directed to the distillation of the carbonylation solvent.

11. The method of claim 1, wherein the polymerization feed stream is neat when introduced into the second reaction zone.

12. The method of claim 1, wherein the polymerization catalyst is a salt of a compound of formula:

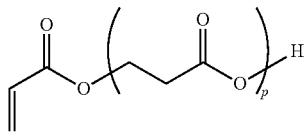

wherein p is 0 to 9.

13. The method of claim 1, wherein the polymerization catalyst is a salt of a compound of formula:

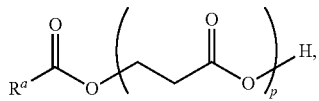

wherein p is from 0 to 9, and $R^a$ is a non-volatile moiety.

14. The method of any one of claim 1, wherein the carbonylation catalyst comprises a metal carbonyl.

15. The method of of claim 1, wherein the carbonylation solvent comprises a polar donating solvent.

16. The method of of claim 1, wherein the polymerization solvent has a dielectric constant at 20° C. of less than about 13.6.

17. The method of claim 1, wherein the polymerization solvent comprises a Lewis base and is less polar than 1,3-dioxane, ortho-difluorobenzene, or metadifluorobenzene.

18. The method of claim 1, wherein the polymerization solvent is less polar than the carbonylation solvent as measured by dielectric constant.

* * * * *